United States Patent
Tang et al.

(10) Patent No.: US 9,626,257 B1
(45) Date of Patent: Apr. 18, 2017

(54) TECHNIQUES FOR CACHE UPDATES BASED ON QUALITY OF SERVICE

(75) Inventors: Xuan Tang, Hopkinton, MA (US); James O. Pendergraft, Durham, NC (US); Norman Speciner, Medway, MA (US); Bruce Rabe, Dedham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 870 days.

(21) Appl. No.: 13/409,413

(22) Filed: Mar. 1, 2012

(51) Int. Cl.
| | |
|---|---|
| *G06F 15/16* | (2006.01) |
| *G06F 11/20* | (2006.01) |
| *G06F 12/08* | (2016.01) |
| *H04L 29/08* | (2006.01) |

(52) U.S. Cl.
CPC .............. *G06F 11/20* (2013.01); *G06F 12/08* (2013.01); *H04L 29/08* (2013.01)

(58) Field of Classification Search
CPC ......... G06F 11/20; G06F 12/08; G06G 17/30; H04L 29/08
USPC ........ 709/203, 224, 233; 711/118, 136, 122, 711/133, 141
See application file for complete search history.

(56) References Cited

U.S. PATENT DOCUMENTS

| | | | |
|---|---|---|---|
| 5,956,744 A * | 9/1999 | Robertson et al. | 711/122 |
| 6,678,793 B1 * | 1/2004 | Doyle | G06F 12/00 711/133 |
| 2004/0034746 A1 * | 2/2004 | Horn | G06F 12/0866 711/141 |
| 2007/0168394 A1 * | 7/2007 | Vivekanand | 707/200 |
| 2009/0010264 A1 * | 1/2009 | Zhang | H04L 47/2425 370/395.21 |
| 2009/0215411 A1 * | 8/2009 | Tucker et al. | 455/90.2 |
| 2010/0235585 A1 * | 9/2010 | Dowlatkhah | 711/136 |
| 2011/0060881 A1 * | 3/2011 | Gallagher | G06F 17/30902 711/133 |
| 2011/0231481 A1 * | 9/2011 | Calahan | G06F 17/30902 709/203 |
| 2012/0290790 A1 * | 11/2012 | Meirosu et al. | 711/118 |
| 2013/0130642 A1 * | 5/2013 | Joul | H04L 41/5064 455/406 |

\* cited by examiner

*Primary Examiner* — Thuong Nguyen
(74) *Attorney, Agent, or Firm* — Muirhead and Saturnelli, LLC

(57) ABSTRACT

Described are techniques for processing requests. A request is received at a server from a client to apply a first update to first data. A cached copy of the first data is stored in a cache of the server. A quality of service is associated with the request. The quality of service affects when the first update is applied to the cached copy of the first data. The first update is applied to the first data. In accordance with the quality of service, the first update is applied to the cached copy of the first data.

21 Claims, 19 Drawing Sheets

FIGURE 11

Wizard Steps

- Select Data Mover
- Select Volume Management Type
- Select a Storage Pool
- Enter File System Info.
- Enable Auto Extension (Optional)
- Default Quota Settings
- ⬆ Set User Storage Limits (Optional)
- ○ Set User File Count Limits (Optional)
- ○ Set Group Storage Limits (Optional)
- ○ Set Group File Count Limits (Optional)
- ○ Enforce Hard Limits
- ○ Set Quota Grace Periods
- ○ Overview / Results Set User Storage Limits (Optional)

Leave the limits blank if you wish to set them to unlimited:

Enter hard limit for user storage:
100 MB

Enter soft limit for user storage:
50 MB

Please specify the hard and soft storage limits for user quotas. Values should be between 1 and 268,435,455 MB (256 TB), or leave field blank for unlimited storage.

< Back    Finish    Cancel

TECHNIQUES FOR CACHE UPDATES BASED ON QUALITY OF SERVICE

BACKGROUND

Technical Field

This application generally relates to caching techniques and more particular to cache update techniques.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

In connection with data storage systems, or more generally any type of system, caching may be used whereby data of the cache may be used to service operations rather than data as may be stored on a slower storage medium, such as disk. When a requester requests data, there may be considerable latency incurred in the process of retrieving the data from the disk. A cache may store data in a memory characterized as a relatively fast memory that is separate from the disks in order to address some of the latency issues associated with disks. The cache memory may contain some or a portion of the data as stored on the disk. Upon receiving a request, for example, to read data, the data storage system may service the request using the cached data if such requested data is currently in the cache.

SUMMARY OF THE INVENTION

In accordance with one aspect of the invention is a method for processing requests comprising: receiving, from a client at a server, a request to apply a first update to first data, a cached copy of the first data being stored in a cache of the server; determining a quality of service associated with the request, said quality of service affecting when the first update is applied to the cached copy of the first data; applying the first update to the first data; and applying, in accordance with the quality of service, the first update to the cached copy of the first data. The quality of service associated with the request may be one of a plurality of predefined quality of service levels. The plurality of predefined quality of service levels may include three predefined quality of service levels, a first of the three predefined quality of service levels denoting a highest quality of service, a second of the three predefined quality of service levels denoting a level lower than the first quality of service level, and a third of the three predefined quality of service levels denoting a level lower than the second quality of service level. The quality of service associated with the request may be the first quality of service level and the method may include performing first processing to apply the first update to the first data; performing second processing to apply the first update to the cached copy of the first data; and returning a response to the client that the request has completed after the first update has been applied to both the cached copy and the first data. The quality of service associated with the request may be the second quality of service level and the method may include performing first processing to apply the first update to the first data; performing second processing to apply the first update to the cached copy of the first data; and returning a response to the client that the request has completed, wherein the response is returned after the first update has been applied to the first data and without requiring that the first update be applied to the cached copy of the first data. The first processing and the second processing may be performed concurrently and all of the first processing and at least a portion of the second processing may have completed prior to returning the response to the client. The quality of service associated with the request may be the third quality of service level and the method may include performing first processing to apply the first update to the first data; and returning a response to the client that the request has completed after the first update has been applied to the first data and prior to commencing second processing to apply the first update to the cached copy. The second processing may be performed as part of normal processing operations where updates to the first data including the first update are applied to the cached copy at an occurrence of a predetermined time interval. The client may issue a second request to read at least a portion of the first data and the second request may be serviced by the server using the cached copy of the first data. All requests to read first data may be serviced using the cached copy of the first data owl not serviced using the first data. The quality of service may be specified as a value in a field of the request where the value identifies one of a predefined set of quality of service levels. The quality of service may not be specified in a field of the request and the server may perform first processing to implicitly determine the quality of service. The first processing may include determining a match between criteria included in a profile and first information associated with any of the client and the request, wherein the profile specifies a new quality of service level associated with the request if first processing determines a match between the criteria and the first information. The criteria of the profile may include any of a type of request, a pattern of a plurality of requests, and client attributes. The client attributes may include information denoting whether the client is using a graphical user interface or a command line interface to issue the request and information identifying a user account. The first data may be data storage configuration data. The client may issue the request to modify the data storage configuration data. The server may be the data storage system having a configuration described by the data storage configuration data. The data storage configuration data may be stored on a storage device of the data storage system.

In accordance with another aspect of the invention is a computer readable medium comprising code stored thereon for processing requests, the computer readable medium comprising code stored thereon for: receiving, from a client at a server, a request to apply a first update to first data, a cached copy of the first data being stored in a cache of the server; determining a quality of service associated with the request, said quality of service affecting when the first update is applied to the cached copy of the first data; applying the first update to the first data; and applying, in accordance with the quality of service, the first update to the cached copy of the first data. The quality of service associated with the request may be one of a plurality of predefined quality of service levels. The plurality of predefined quality of service levels may include three predefined quality of service levels, a first of the three predefined quality of service levels denoting a highest quality of service, a second of the three predefined quality of service levels denoting a level lower than the first quality of service level, and a third of the three predefined quality of service levels denoting a level lower than the second quality of service level.

In accordance with another aspect of the invention is a system comprising:
a client and a data storage system in communication with said client. The data storage system includes a memory comprising code stored therein for processing requests, the memory comprising code stored therein for: receiving, from the client, a request to apply a first update to first data, a cached copy of the first data being stored in a cache of the data storage system; determining a quality of service associated with the request, said quality of service affecting when the first update is applied to the cached copy of the first data; applying the first update to the first data; and applying, in accordance with the quality of service, the first update to the cached copy of the first data.

BRIEF DESCRIPTION OF THE DRAWINGS

Features and advantages of the present invention will become more apparent from the following detailed description of exemplary embodiments thereof taken in conjunction with the accompanying drawings in which:

FIGS. 9-11 are examples of screenshots as may be displayed in a graphical user interface (GUI) in connection with illustrating use of the techniques herein with a QOS level of 2;

DETAILED DESCRIPTION OF EMBODIMENT(S)

Figure 1:
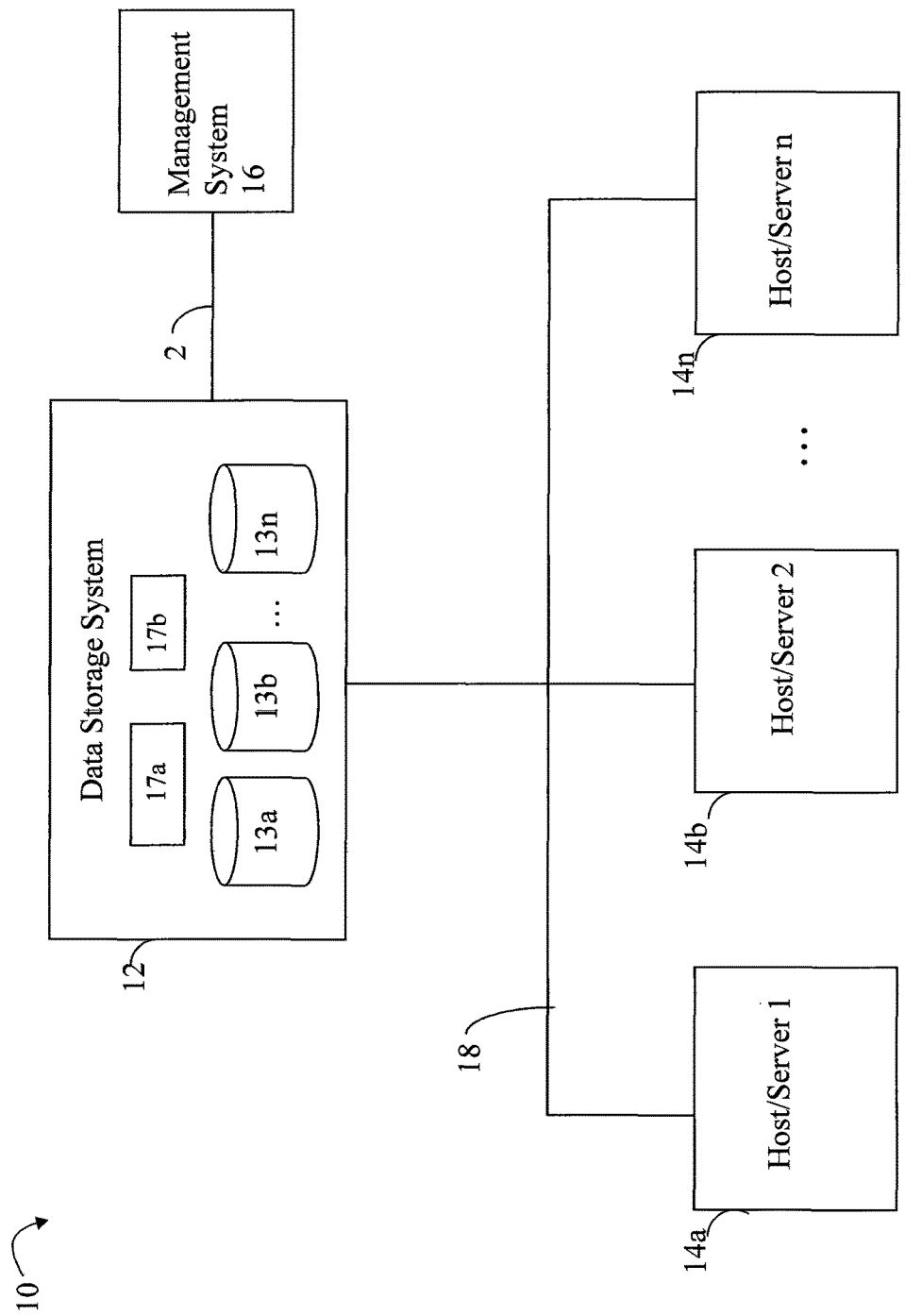
FIG. 1 is an example of an embodiments of a system that may utilize the techniques described herein.

Referring to FIG. 1, shown is an example of an embodiment of a system that may be used in connection with performing the techniques described herein. The system 10 includes one or more data storage systems 12 connected to server or host systems 14a-14n through communication medium 18. The system 10 also includes a management system 16 connected to one or more data storage systems 12 through communication medium 2. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 2 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the system 10. In one embodiment, the communication medium 2 may be a LAN connection and the communication medium 18 may be an iSCSI or Fibre Channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 2 by any one of variety of connections in accordance with the type of communication medium 2. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 2, a variety of different communication protocols may be used such as SCSI, Fibre Channel, iSCSI, and the like. Some or all of the connections by which the hosts, management system, and data storage system may be connected to their respective communication medium may pass through other communication devices, such as switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the data storage systems 12 may include one or more data storage systems such as one or more of the data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems and management system 16 may include code thereon for performing the techniques as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

For purposes of illustration, the techniques herein will be described with respect to a single unitary data storage system, such as single data storage array, including two service processors or compute processing units. Techniques herein may be more generally use in connection with any one or more data storage system each including a different number of service processors than as illustrated herein. The data storage system 12 may be a data storage array, such as a VNX™ data storage array by EMC Corporation of Hopkinton, Mass., including a plurality of data storage devices 13a-13n and two service or storage processors 17a, 17b. The service processors 17a, 17b may be computer processing units included in the data storage system for processing requests and commands. In connection with performing techniques herein, an embodiment of the data storage system may include multiple service processors including more than two service processors as described. The VNX™ data storage system mentioned above may include two service processors 17a, 17b for performing processing in connection with servicing requests. Additionally, the two service processors 17a, 17b may be used in connection with failover processing when communicating with the management system 16. Client software on the management system 16 may be used in connection with performing data storage system management by issuing commands to the data storage system 12 and/or receiving responses from the data storage system 12 over connection 2. In one embodiment, the management system 16 may be a laptop or desktop computer system.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Figure 2:
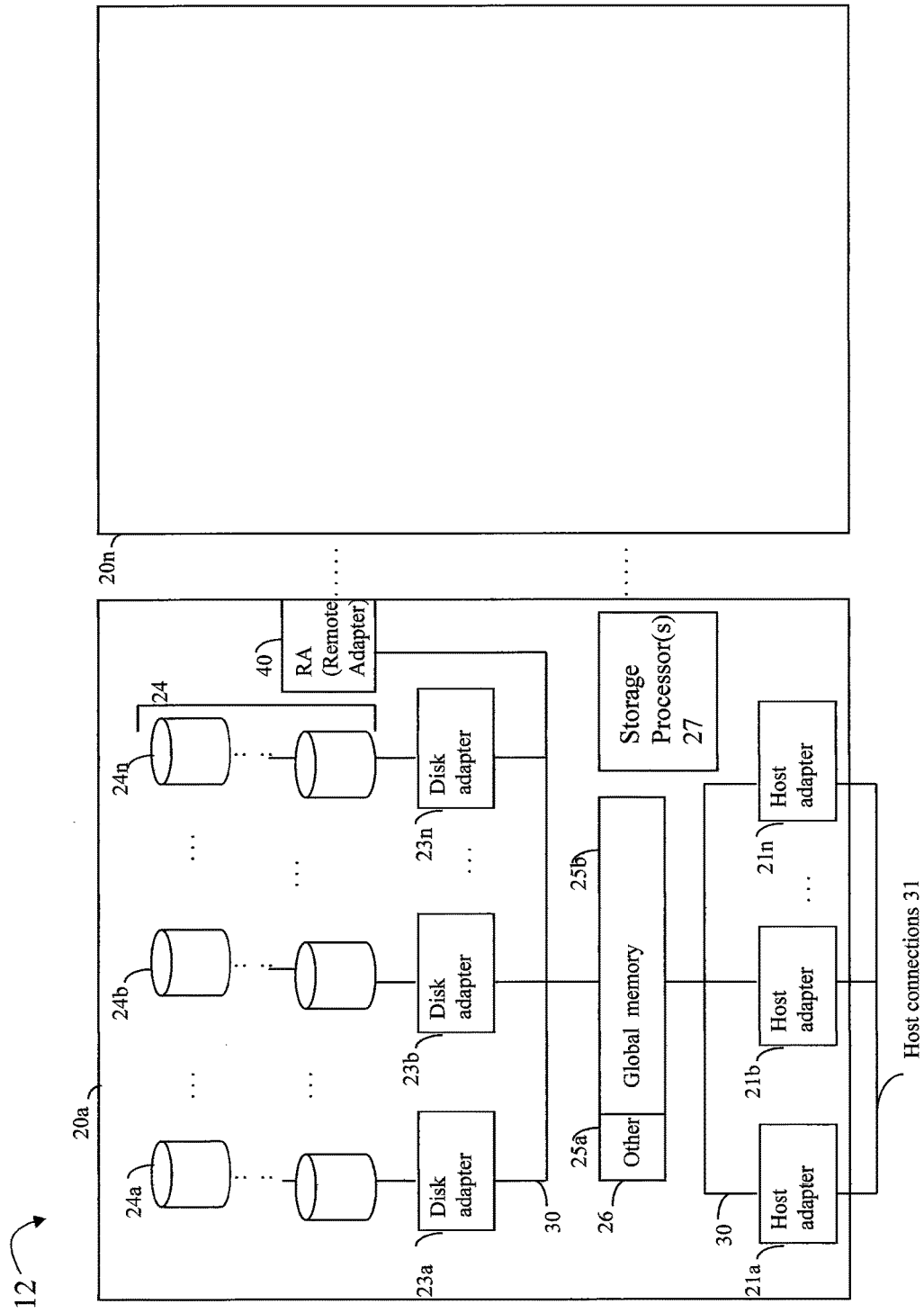
FIG. 2 is an example illustrating details of a data storage system in accordance with techniques herein.

Referring to FIG. 2, shown is an example of an embodiment of the data storage system 12 that may be included in the system 10 of FIG. 1. Included in the data storage system 12 of FIG. 2 are one or more data storage systems 20a-20n as may be manufactured by one or more different vendors. Each of the data storage systems 20a-20n may be a data storage array inter-connected (not shown) to other data storage array(s). Additionally, as noted above, the data storage systems may also be connected to the host systems through any one or more communication connections 31. In this example as described in more detail in following paragraphs, reference is made to the more detailed view of element 20a. It should be noted that a similar more detailed description may also apply to any one or more of the other elements, such as 20n, but have been omitted for simplicity of explanation.

Each of the data storage systems, such as 20a, may include a plurality of storage devices such as disk devices or volumes included in an arrangement 24 consisting of n rows of disks or more generally, data storage devices, 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more storage processors 27. Each of the storage processors 27 may be CPU and an embodiment may include any number of such processors. For example, the VNX™ data storage system by EMC Corporation includes two storage processors. The system 20a may also include one or more host adapters ("HAs") or directors 21a-21n. Each of the HAs may be used to manage communications and data operations between one or more host systems and the global memory. In an embodiment, the HA may be a Fibre Channel Adapter (FA) or other adapter which facilitates host communication. The HA communicates with a component of the host such as a host bus adapter (HBA). Generally, directors may also be characterized as the different adapters, such as HAs (including FAs), DAs RAs and the like, as described herein. Components of the data storage system, such as an HA, which may communicate with a host may also be referred to as front end components. Within the data storage system, components, which may be characterized as backend components, communicate with a front end component. An example of a backend component is a DA. In connection with data storage systems such as by EMC Corporation, various types of directors or adapters may be implemented as a processor, or, more generally, a component that includes the processor. Examples of directors are disk adapters (DAs), host adapters (HAs), and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

Also shown in the storage system 20a is an RA or remote adapter 40. The RA may be hardware including a processor used to facilitate communication between data storage systems, such as between two of the same or different types of data storage systems.

A configuration of a data storage system may be described by data storage configuration information. The data storage configuration information may describe various entities, attributes, and the like, about how the physical storage systems and devices are configured such as by a manager or system administrator. For example, the data storage configuration information may identify and describe LUNs, file systems, RAID groups, and the like, as may be formed using the physical data storage of the data storage system. With reference back to FIG. 1 in one embodiment, management software may be executing on the management system 16 where the user may be issuing requests in connection with reading and/or writing data storage configuration information that may be stored on physical storage device of the data storage system 12. More generally, the management system 16 may be referred to as a client issuing requests to the data storage system 12 which acts as a server to service the client requests (e.g., read and write requests) for data storage configuration information.

Described in following paragraphs are techniques that may be used in connection with performing updates to a cache including a cached copy of data storage configuration information. Although the techniques herein may be described with respect to the particular data and uses thereof, it will be appreciated by those skilled in the art that techniques described herein are more generally applicable for use with any data. Described in following paragraphs are techniques that provide for a quality of service (QOS) driven dynamic cache update of the cached data storage configuration information. The QOS level associated with the cache updates to the cached data storage configuration information is determined in accordance with client requirements and quality expectations. The techniques herein provide for updating the cache based on a QOS level as may be specified by the client request. The cache update processing varies depending on the different QOS level that may associated with a request thereby affecting when the cache including the data storage configuration information is updated.

Traditional existing approaches to cache updates may apply a single static "one size fits all" mechanism where all cache updates are made in the same manner for all client requests independent of, or without considering, client urgency or quality in connection with a user experience on the client issuing the request. Existing approaches not utilizing techniques herein may focus solely on either 1) providing an immediate cache update after a write or set operation to update the configuration data and delaying return of a client response until such cache update has completed, or 2) delaying the cache update to achieve a faster response time by returning a response to the client without requiring that the cache update be performed.

In accordance with techniques herein, the quality expectations of the client's requirements may be categorized into different QOS levels based on different use cases. Techniques herein may use an intelligent cache update manager that dynamically selects and varies cache update processing based on the determined QOS level to achieve the best user experience with understanding of the client's (and user's) quality expectations, delays in natural human behavior and data storage system resource consumption and performance. The techniques herein provide for a satisfactory user experience when utilizing a client to perform data storage configuration and management operations resulting in the client issuing one or more requests to read and/or write data storage configuration information as may be stored on the data storage system.

In one embodiment described herein, the client may issue requests which may be referred to as SET requests or GET requests. A SET request may be a request to write, update or modify data storage configuration data in some manner. For example, a SET request may add new data to an existing set of data storage configuration data (e.g., create or define a new instance of an entity such as provision storage for a new LUN), may delete data from the existing set (e.g., delete a LUN or other instance of an entity), may modify a portion of existing data (e.g., update attribute information associated with an existing LUN or file system). A GET request may be a request to read a portion of existing data storage configuration information. In the embodiment described herein, the SET or write requests to update the configuration data are written directly to the primary copy of the data storage configuration data such as may be stored on disk or other permanent non-volatile storage medium. The data storage system may maintain a cached copy of the data storage configuration information such as may be stored in a cache memory. Periodically, the cached copy of the configuration data may be updated to synchronize with the primary copy. In one embodiment, such periodic updates to the cached copy of the configuration data may be performed routinely as part of normal mode processing. For example, updates to the cached copy of the configuration data may be performed by a process which updates the cache upon each occurrence of defined time interval. Upon the occurrence of an each such interval, the process may obtain the updates to the configuration data as stored on the physical storage or primary copy since the previous interval occurrence. The process may then incorporate any such configuration data updates to the primary copy since the previous interval occurrence into the cached copy of the configuration data.

GET requests or requests to read configuration data may be serviced using the cached copy of the configuration data. As such, since all GET requests may be serviced using the cached copy of the configuration data, techniques herein may be performed to trigger and provide for updating the cached copy at additional times beyond those updates which occur based on routine updates (e.g., such as at defined time intervals as described above as part of normal processing). The additional cache updates may be made at various times depending on the urgency or need from the client perspective for the cached copy to be up to date. For example, such urgency or need may be due to a client GET request which is performed immediately after a client SET request and it is desirable to have the GET request serviced using accurate up to date configuration data. To further illustrate, a user interface (UI) on a client may be displaying a current set of configuration data. A user may select an option which updates the configuration data resulting in the client issuing a first SET request to accordingly update the configuration data. On the data storage system, the SET request results in updating the primary copy stored on disk based on information included in the SET request. The client may then perform processing to update or refresh the UI to reflect the update made by the SET request. Such processing may include the client issuing a second GET request to obtain the configuration data and then updating the client UI based on the configuration data received in response to the GET request. As such, it is desirable for the data storage system receiving the GET request to service this second GET request using updated cached information which reflects the configuration updates as included in the physical storage or primary copy. There may be other instances which are categorized as having a lesser urgency for cache updates than as just described. For example, the client may not be expected to immediately issue the second GET request following the first SET request (e.g., the second GET request may be issued within an amount of time from a previous SET request whereby the routine cache update procedure time interval should provide for timely cache updates). As will be explained in more detail below, a QOS level may be associated with the different SET requests where the QOS level may be based on the particular client request(s) and use cases in order to accordingly apply varied cache update processing techniques to update the cache and incorporate the configuration data updates of the SET requests.

In one exemplary embodiment set forth below, 3 QOS levels or categories are described although an embodiment utilizing the techniques herein may more generally have any number of QOS levels (e.g., 2 or more). The QOS level associated with a request may depend on the client urgency or need to have the cache up to date such as to provide improved client or user experience. In the embodiment with 3 QOS levels, QOS level=1 may denote the highest QOS level and QOS level=3 denoting the lowest QOS level. QOS level=1 may refer to the highest QOS level denoting the greatest level of urgency to have the cache copy include or reflect updates as applied to the primary copy. QOS level=2 may refer to the second highest QOS level denoting the second greatest level of urgency to have the cache copy include or reflect updates as applied to the primary copy. QOS level=3 may refer to the lowest QOS level denoting the least level of urgency to have the cache copy include or reflect updates as applied to the primary copy.

As an example of a use case that may have a QOS level=1, consider the following where a user has displayed on a client UI a current list of existing LUNs and properties and is now making UI selections interactively to add or create a new LUN. Once the new LUN has been created, the UI display is then updated to include a revised LUN list including the newly created LUN and its associated properties. In connection with creating or adding the new LUN, the client may obtain the information regarding the newly created LUN from the user via the UI and then issue a SET request to create the new LUN using the information obtained from the user. Subsequently, as noted above, the client wants to update or refresh the displayed LUN table to additionally include the information on the newly create LUN. This refresh may be performed by the client issuing a subsequent GET request (after the above-mentioned SET) to retrieve the cached configuration information. It is desirable for the cached configuration information used to perform this refresh to include the newly created LUN information. More generally, the cached configuration information returned to the client in response to the client's second GET request should include the added configuration information sent in the client's first SET request. In another aspect, servicing the second GET request and return configuration information to the client may be characterized as having a dependency on the cached configuration information including the configuration data from the first SET request. As such, there is a need to update the cache immediately to include the added configuration information of the first SET request before providing cached data in response to the client's second GET request.

As another example which is in contrast to the above-mentioned QOS level=1 example, consider a command line interface (CLI) where such CLI commands may be batched such as in connection with executing a script. In this case, there may be no UI display including a table of information as above and, as such, no need to provide any displayed information immediately to the client for purposes of refreshing or updating a UI display. In such a case when batching CLI commands by issuing multiple sequential SET requests and where there is no displayed table in a UI, there may be no need to ensure that the SET request updates are immediately applied to the cached copy of the configuration used to service GET requests since no immediate subsequent GET request is expected for refreshing a client display. As such, there is no urgency from the client's perspective for an immediate cache update to reflect the multiple SET requests. In this case, the QOS level of 3 may be specified for cache updates related to client GET requests for the above-mentioned CLI commands. This latter example having a QOS level=3 (e.g., where there is no immediate need or urgency to update the cache from the client's perspective) provides a direct contrast to the previous example having a QOS level=1. As described in more detail elsewhere herein, with QOS level=3 (the lowest or least urgency for a cache update), the cached configuration data may be updated as part of routine cache updating procedures that may be utilized. For example, an embodiment may periodically update the cached configuration data upon the occurrence of a defined time interval as described above. In contrast, when there is a QOS level=1, the cache may be updated an additional time beyond that which is performed by the periodic cache update as part of normal routine processing. Thus, having a QOS level of 1 may trigger such an additional cache update whereby, in distinct contrast, having a QOS level of 3 may not result in any such additional triggers for cache updates beyond normal routine processing.

Additional detail regarding cache update processing that may be performed for each of the three QOS levels is described below.

Figure 3:
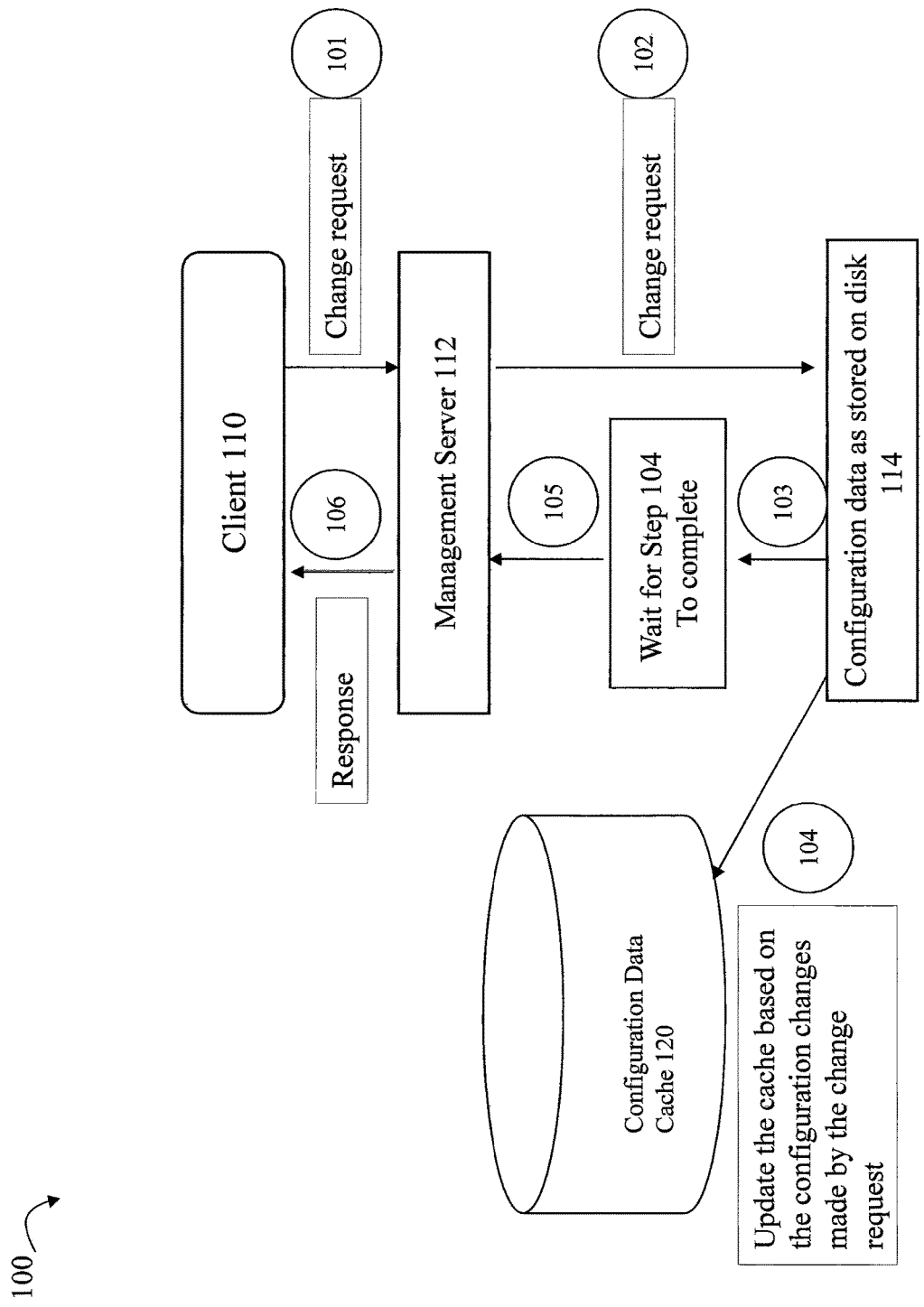
FIG. 3 is an example illustrating processing and data flow in connection with a QOS level of 1 as may be performed in an embodiment in accordance with techniques herein.

Referring to FIG. 3, shown is an example illustrating processing as may be performed in connection with cache updates of the data storage configuration data with a SET request having an associated QOS level=1. For the highest priority of QOS cache updates where QOS=1, the cache is updated synchronously as part of the SET operation whereby the client is not notified regarding completion of the set operation until both the primary copy of the configuration data as stored on disk and the cached copy of the configuration data have been updated to incorporate changes made by the SET operation. The foregoing is illustrated by the example 100 which includes the client 110 sending a change request via a SET operation request in step 101. The SET request is received at the management server 112 which may be a component included in the data storage system. Processing is performed to determine the associated QOS level of the request. In one embodiment, the QOS level may be specified explicitly as a field in the payload of the request 101. Based on the QOS level=1 as may be specified in the request 101, the management server 112 may issue the change request 102 to update the configuration data as stored on disk (e.g. the primary copy of the configuration data). As illustrated by 104, processing may be performed to cause the updates to the configuration data stored on disk 114 due to the request 101 to also be reflected in the cached copy of the configuration data 120. Step 104 illustrates the additional cache update request and associated processing performed beyond that as described herein in connection with normal processing to update the cached data of 120. As illustrated by 103, processing waits for step 104 to complete (e.g., wait for completion of applying the cache updates of step 104). Once 104 has completed, the management server 112 is notified and the response 106 may be returned to the client 110.

Although not illustrated in FIG. 3 but described elsewhere herein, the cached configuration data 120 may be periodically updated at predetermined time intervals as part of normal routine processing. The update illustrated by 104 may be characterized as the extra "out of band" cache update operation performed in connection with cache update processing for QOS level=1.

Figure 4:
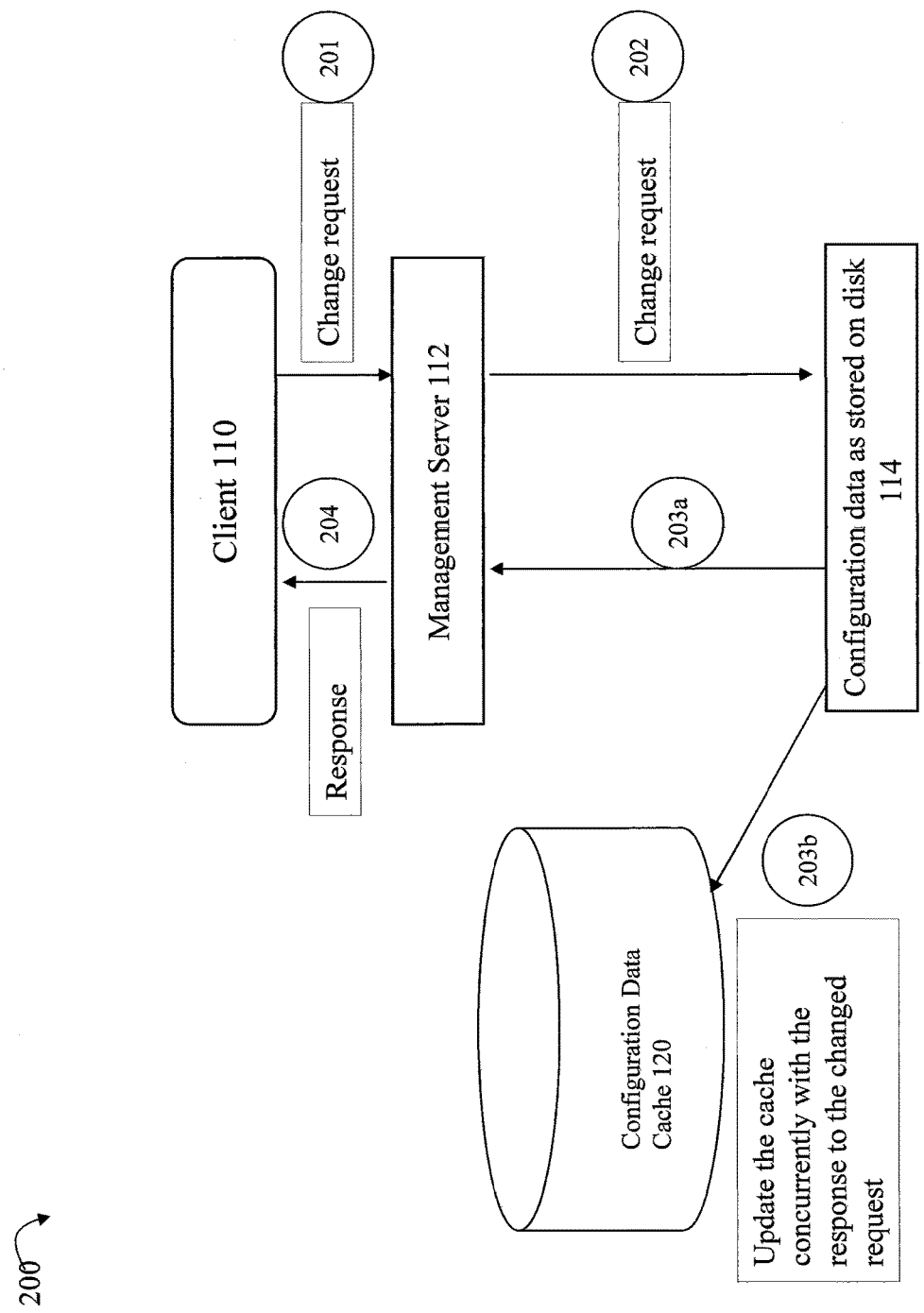
FIG. 4 is an example illustrating processing and data flow in connection with a QOS level of 2 as may be performed in an embodiment in accordance with techniques herein.

Referring to FIG. 4, shown is an example illustrating processing as may be performed in connection with cache updates of the data storage configuration data with a SET request having an associated QOS level=2. Processing for QOS=2 is similar in aspects to that as described in connection with QOS=1 in that an additional request is made to update the cached copy of the configuration data (e.g., additional request beyond that of normal routine processing to update the cache). However, such cache update triggered by the additional request is performed in a manner that is decoupled from the SET update change request to the primary copy of the configuration data as stored on disk. In other words, the client is notified regarding completion of the SET operation change request independent of the cache update. In this way, the cache update request may be triggered and then the actual cache update may be performed whereby sending a response to the client is not dependent upon (or independent of) having the cache update completed. For example, the data storage system may perform processing in parallel or concurrently to return a response to the client and also update the cached configuration data. With QOS=2, the response sent to the client is not blocked as in connection with QOS=1 (illustrated by FIG. 3) while waiting for the cache to be updated. Thus, the return of the response to the client in 204 does not guarantee that the cache 120 has been updated to reflect the updates of the change request 201.

In the example 200, the client 110 issues a change request 201 to perform a SET operation to update configuration data. The request 201 is received by the management server 112 which then issues the change request 202 to update the configuration data as stored on disk in the primary copy of the configuration data. Thus, steps 201 and 202 are similar to that as described in connection with FIG. 3. However, in the case where QOS=2, the processing as illustrated by the combination of steps 203a and 204 may be perform concurrently with processing illustrated by 203b. As illustrated by 203a, processing includes communicating with the management server 112 that processing of the request has completed thereby causing the server 112 to send a response 204 to the client 110. As illustrated by 203b, a request is issued to update the cache concurrently with issuing the response illustrated by 203a and 204.

In a manner similar to that as described above in connection with FIG. 3, although not illustrated in FIG. 4 but described elsewhere herein, the cached configuration data 120 may be periodically updated at predetermined time intervals as part of normal routine processing. The update illustrated by 203b may be characterized as the extra "out of band" cache update operation performed in connection with cache update processing for QOS level=2.

Figure 5:
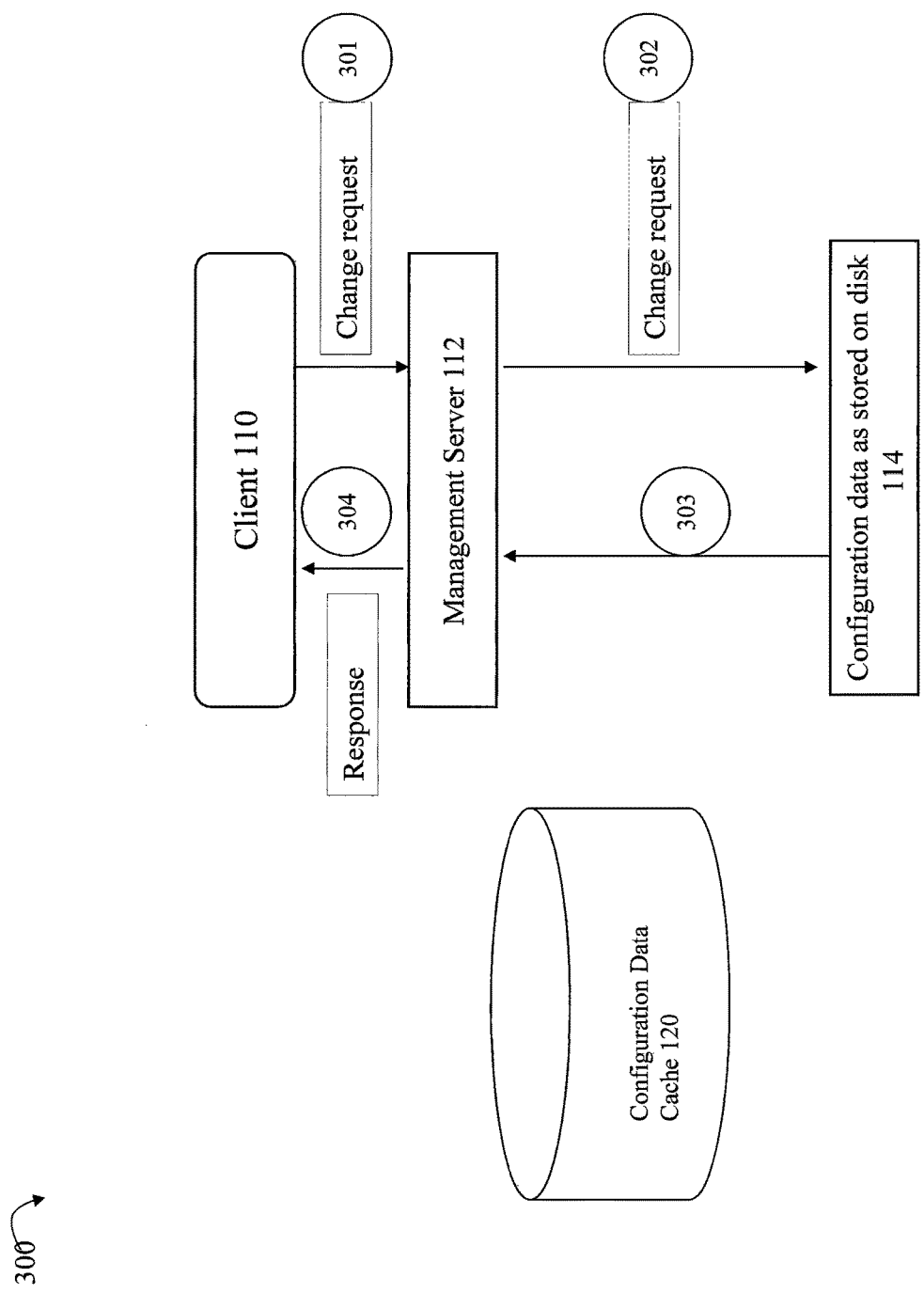
FIG. 5 is an example illustrating processing and data flow in connection with a QOS level of 3 as may be performed in an embodiment in accordance with techniques herein.

Referring to FIG. 5, shown is an example illustrating processing as may be performed in connection with cache updates of the data storage configuration data with a SET request having an associated QOS level=3. With this lowest QOS level=3, there is no additional request to update the cached copy beyond that as performed by routine or normal mode processing. In this manner, the SET request or change request updates the primary copy of the configuration data stored on disk and then returns a response to the client that the SET has completed. The cached copy of the configuration data is then updated to include the SET request updates as part of routine processing such as at the occurrence of the next periodic interval.

In the example 300, the client 110 issues a change request 301 to perform a SET operation to update configuration data. The request 301 is received by the management server 112 which then issues the change request 302 to update the configuration data as stored on disk in the primary copy of the configuration data. Thus, steps 301 and 302 are similar to that as described in connection with FIGS. 3 and 4. As illustrated by 303, once the update to the configuration data stored on disk 114 has completed, the management server 112 is so notified and the server 112 sends a response 304 to the client 110. In this example 300 (in contrast to FIGS. 3 and 4), no additional request is issued to update the cached configuration data.

In a manner similar to that as described above in connection with FIGS. 3 and 4, although not illustrated in FIG. 5 but described elsewhere herein, the cached configuration data 120 may be periodically updated at predetermined time intervals as part of normal routine processing. Since there is no additional or "out of band" cache update processing performed beyond that of normal routine processing for QOS=3, no such additional cache update is illustrated in connection with FIG. 5.

What will now be described are some further examples illustrating use cases in connection with QOS levels 1 and 2. It should be noted that these and other examples of when various QOS levels may be specified are merely some examples of different scenarios where such QOS levels may be specified for particular operations.

Figure 6:
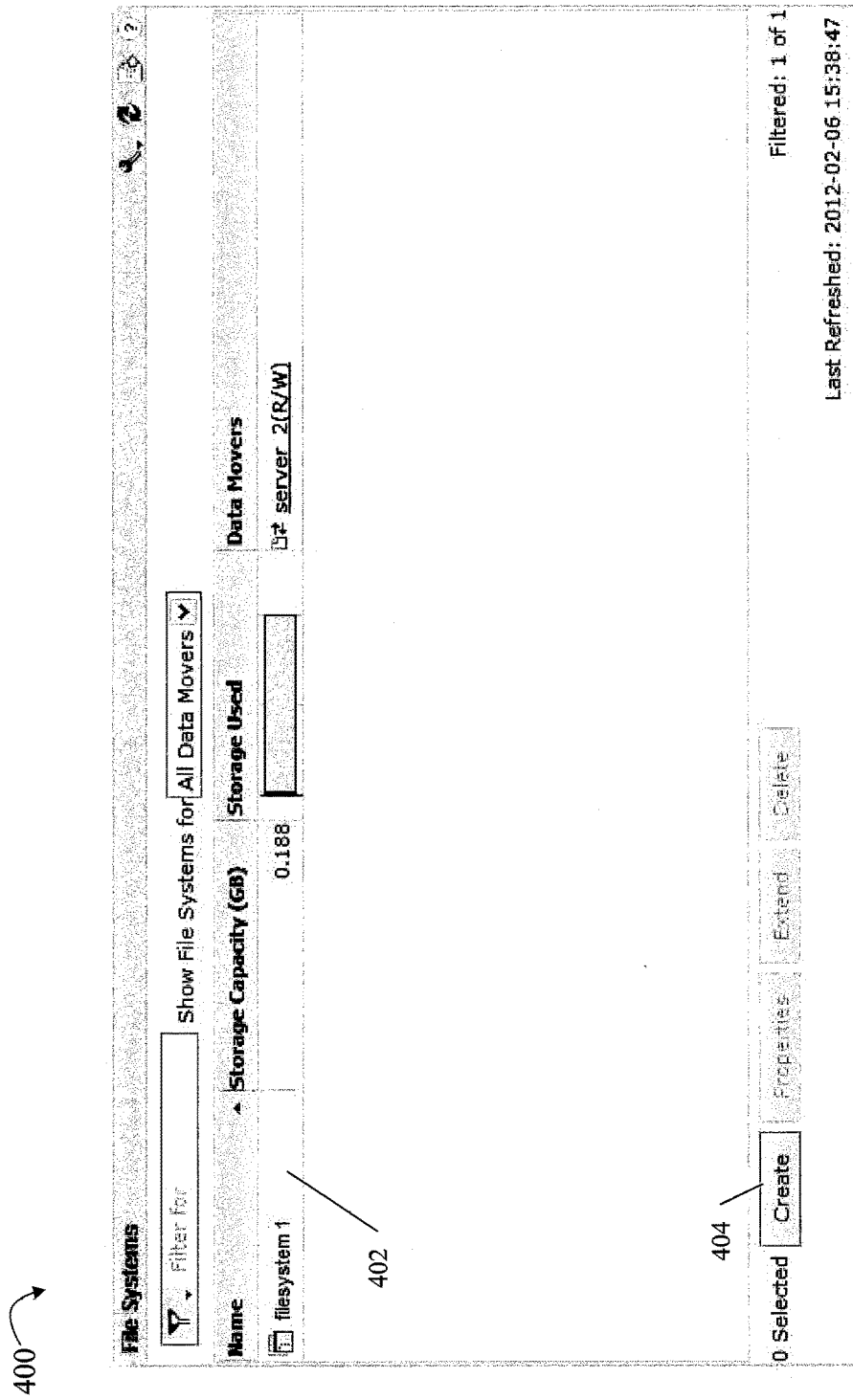
FIGS. 6-8 are examples of screenshots as may be displayed in a graphical user interface (GUI) in connection with illustrating use of the techniques herein with a QOS level of 1.
Figure 7:
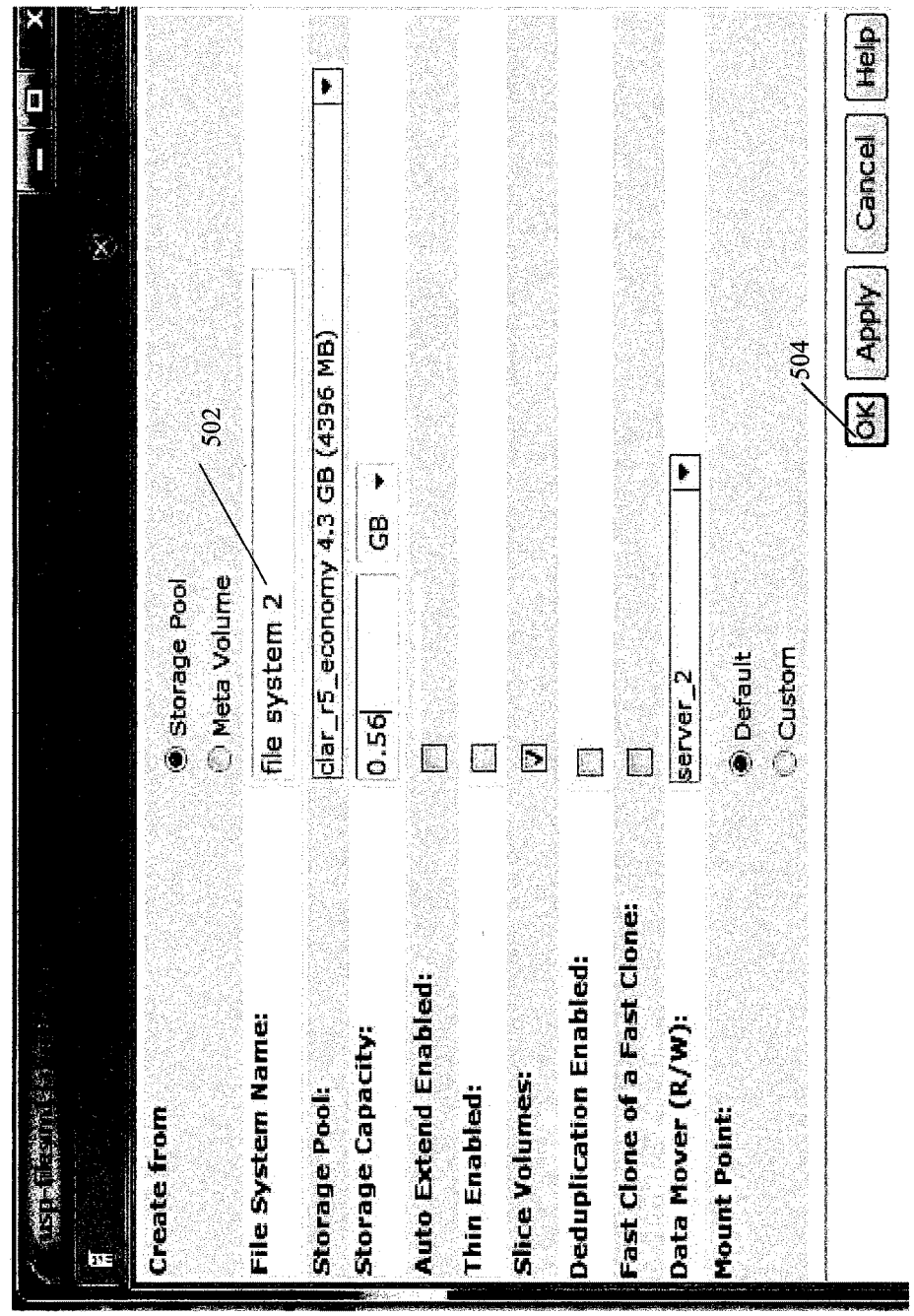
Figure 8:
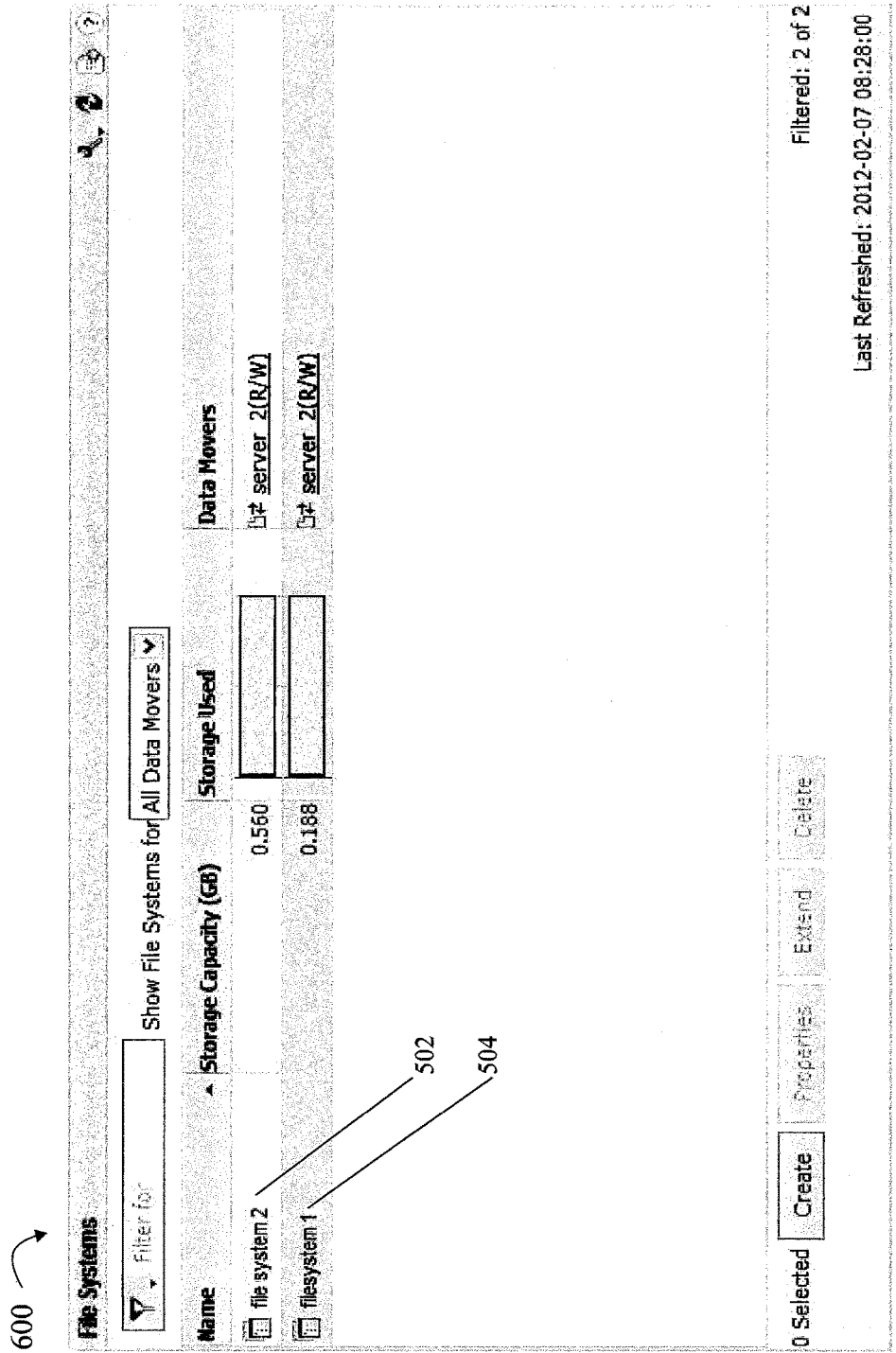

With reference now to FIGS. 6-8, an example use case is described to illustrate use of QOS level=1 in an embodiment in accordance with techniques herein.

Referring to FIG. 6, shown is an example of screenshot as may be displayed in a client GUI. The example 400 illustrates a display including a list of existing file systems in which there is only a single file system denoted by 402. At this point, the user wants to create a second file system and selects the create button 404. Responsive to selecting 404, the GUI is updated to display the screenshot as included in FIG. 7. The user enters various inputs as illustrated in the example 500 of FIG. 7 to create a new file system 2 as denoted by 502. Once the user has completed entering the requested input of the example 500, the user may select OK 504. Responsive to selecting 504, the client may issue a SET request to the data storage system with the new file system information to create the new file system. The request may include a payload having data based on the user inputs entered and illustrated in FIG. 7. The request issued by the client to create the new file system may also explicitly specify a QOS level of 1 in the request. As described elsewhere herein, the QOS level may be specified as a value in a field of the request data in a manner similar to other data values such as those denoting various file system attributes as may be based on user inputs illustrated in FIG. 7. Consistent with description elsewhere herein in connection with FIG. 3 processing for QOS level=1, the data storage system may perform processing for the SET request which in this example is a request to create a new file system. Once the response is returned to the client and its GUI, the client is ensured that the cached copy of the configuration data on the data storage system reflects the SET request updates of the created file system as also applied to the primary copy of the configuration data as stored on disk. The client may then issue a second GET request requesting to read the list of all currently defined file systems and attributes thereof. Consistent with above-referenced description, the data storage system receives the GET request and services the GET request using the cached copy of the configuration data by return the requested data to the client. Once the client has received the response to the GET request which include the requested file system list and information, the client may update the displayed information of its GUI to refresh the file system table resulting in the screenshot as illustrated in FIG. 8. In the example 600 of FIG. 8, the list of file systems includes the previously existing file system 1 504 and also the newly created file system 2 502.

Figure 9:
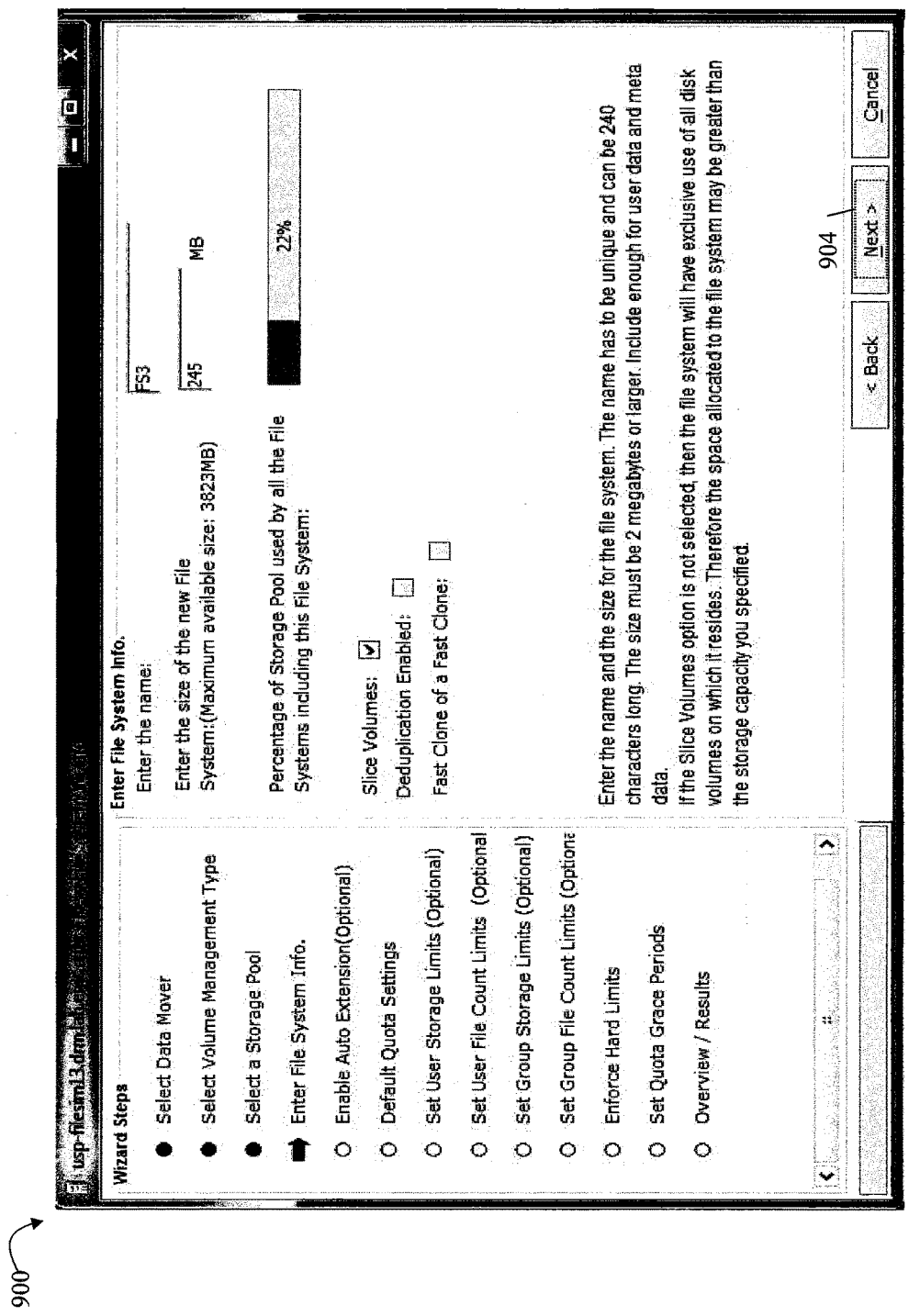
Figure 10:
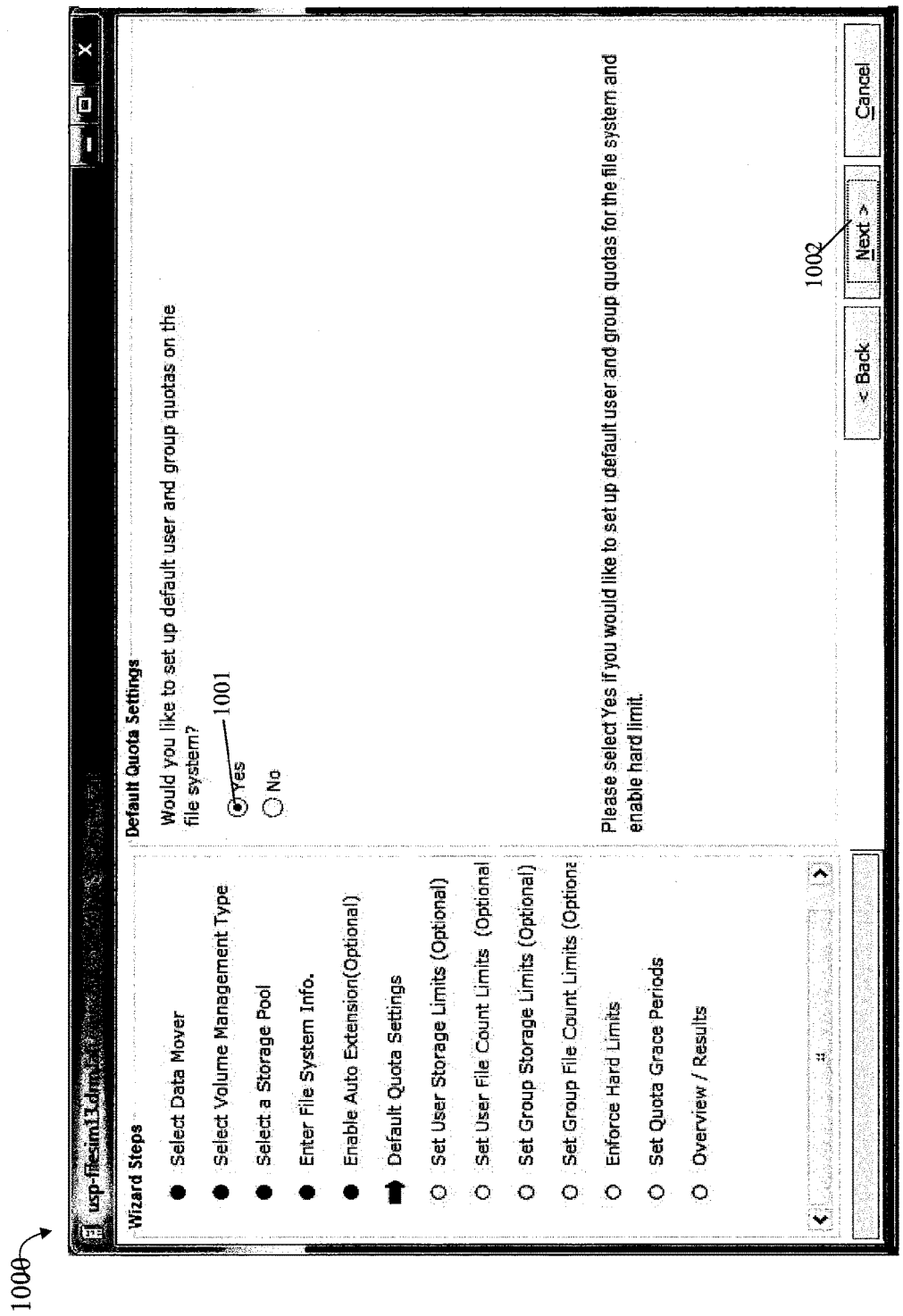

With reference now to FIGS. 9-11, an example use case is described to illustrate use of QOS level=2 in an embodiment in accordance with techniques herein. In connection with this example for creation of a file system, a user may execute a wizard in which information of the file system is entered in multiple steps of multiple screenshots or UI displays. As such, the QOS=2 may be used to update the cache since there is a more relaxed desire to update the cache in comparison to the previous example of QOS=1.

With reference to FIG. 9, the user enters an initial set of file system information to create file system FS3 and selects the next button 904. Responsive to selecting 904, the client sends a create file system request to the data storage system. The request may include a payload having data based on the user inputs entered and illustrated in FIG. 9. The request issued by the client to create the new file system may also explicitly specify a QOS level of 2 in the request. As described elsewhere herein, the QOS level may be specified as a value in a field of the request data in a manner similar to other data values such as those denoting various file system attributes as may be based on user inputs illustrated in FIG. 9. Consistent with description elsewhere herein in connection with FIG. 4 processing for QOS level=2, the data storage system may perform processing for the SET request which in this example is a request to create a new file system. A response is returned to the client. Also responsive to selecting 904, the client may display the screenshot as illustrated in FIG. 10 where the user may now specify information on file system quotas. In this example, the user indicates that she would like to set up default quotas by selecting yes 1001 and then selects the next button 1002. Responsive to selecting 1002, the wizard dialog continues and the screenshot of FIG. 11 may be displayed where the user enters additional information on quotas in connection with user storage limits Once the user has completed entering information in connection with FIG. 11, the user may select 1104 to complete or finish the wizard dialog. Responsive to selecting 1104 indicating that input is complete regarding the quota information, the client may send a second request, a GET request, to get information on the newly created file system in connection with the previous SET request as generated in response to selecting 904 of FIG. 9. The GET request may return various attributes and other metadata about the newly created file system FS3 including the file system handle. The client may now add additional metadata for the file system FS3 by issuing a third request, another SET request, whereby the client communicates the additional file system attributes as metadata updates for the file system FS3. The updates communicated in the SET request to SET file system quota limits may include the quota limits specified in the user inputs of the screenshots of FIGS. 10 and 11. The QOS level of this SET request to set the quota limits may also be explicitly specified in the SET request data as level 2.

An embodiment may provide for specifying a QOS level for an update or SET request in a variety of different ways. One way as described herein is by having the client explicitly specify the QOS level in the client request as a field in the request payload. As another way, an embodiment may determine a QOS level implicitly in cases where the client request does not explicitly identify one of the predefined QOS levels of 1, 2 or 3. For example, a data storage system receiving such a request which does not explicitly specify a QOS level may determine an QOS level based on a QOS policy which specifies a default QOS level if none is explicitly indicated in the request (e.g. one of the predefined QOS levels is not included in the SET request). The QOS policy may be defined using one or more profiles or templates where a QOS level is specified based on one or more attributes of the request and/or client. For example, a QOS level may be specified for various types of SET requests (e.g., based on creating a LUN, creating a RAID group, creating a storage group, creating a file system, setting file system metadata or attributes, and the like). Thus, in one aspect, profiles may be used to determine a QOS level for a single request based attributes of the single SET request to update data storage configuration data.

In another aspect, profiles may be used to determine a QOS level for a request based on detected pattern or series of SETs and/or GET operation. The data storage system may monitor the pattern of client requests such as to determine a series of SET and/or GET operations from a client and determine a QOS level by determining a match between the observed or detected request pattern and the predefined pattern specified in a profile. For example, a user may be creating multiple LUNs using a GUI having a display that is updated after each LUN is created to include the new LUN information. The user may select GUI options to create LUN1 resulting in a first SET request to create a new LUN. The client may issue a first GET request to obtain the current list of LUNs which includes only LUN1 to refresh the GUI display. The user then select GUI options to create LUN2 resulting in a second SET request to create a new LUN. The client may issue a second GET request to obtain the current list of LUNs which now includes LUN1 and LUN2 to refresh the GUI display. The user then selects GUI options to create LUN3 resulting in a third SET request to create a new LUN. The client may issue a third GET request to obtain the current list of LUNs which now includes LUN1, LUN2 and LUN3 to refresh the GUI display. In this example, assume the requests do not specify a QOS level in the request so that other means may be utilized to determine a QOS level for the SET requests. On the data storage system which receives the requests, processing may be performed to monitor the series of requests from the client. When the first SET request is received to create LUN1, the QOS level may be set to a default or initial QOS level based on a defined QOS policy such as QOS=2 or QOS=3. The data storage system may continue to monitor the requests and receives the first GET request (to retrieve the list of current LUNs which includes LUN1). At this point, the data storage system may detect a pattern of requests from the client for creating LUNs and after each such LUN is created, a GET is performed to retrieve the current list. At this point, the data storage system may assign a QOS level=1 to the detected pattern and block or not return a response to the GET request to the client until the previously issued first SET request update has been applied to the cache. Thus, after receiving the first GET request to retrieve a list of LUNs and associated LUN information, the data storage system may assign the QOS level=1 to the detected pattern thereby both reassigning a QOS priority to the first SET request and also assigning a priority of QOS=1 for any subsequent SET requests (to create additional LUNs) of the detected pattern. In this example, the pattern detected is repeated pairs of SET and GET operations where each SET operation is an operation to create a new LUN followed by a GET operation to retrieve a list of currently provisioned or existing LUNs and associate LUN information (e.g., attributes). A profile may be defined for such a pattern whereby upon receiving the first GET operation, the QOS level is then updated to QOS=1. The QOS=1 may be assigned to each subsequent SET operation to create a new LUN received from the same client which follows the pattern or sequence defined in the profile. Additionally, it should be noted that when the first GET operation is received and the pattern assigned QOS=1, the cache may not yet have been updated to include the updates from the first SET operation to create LUN1 and also may include other pending cache updates affecting the LUN information returned in response to the first GET operation. In such a case, the cache may also be updated to include the pending cache update from the first SET operation to create LUN1. More generally, in such a case, any/all pending cache updates that may cause a change to the information returned in connection with the GET request of the pattern to retrieve the current LUN information may be applied to the cache.

If, after issuing the above-mentioned three pairs of SET and GET operations (e.g., SET to create a new LUN and GET to retrieve the list and information on all currently existing LUNs), the client then issues a request other than a SET to create a new LUN, the data storage system may determine that the client request pattern no longer matches that of the profile and may use other profiles, default QOS levels, and the like, to determine the QOS level for cache updating associated with the next SET request.

Generally, the profile may identify a pattern of client requests and associate a QOS level to be assigned for cache updates once the pattern has been detected. The pattern may be detected, for example, after a specified number of requests in the pattern have been received by the data storage system. For example, based on the latter case described above, the pattern may be detected after receiving the second request (e.g., first request=SET request to create LUN1, second request=GET request to retrieve information on all currently defined LUNs, third request=SET request to create LUN2) and the QOS level=1 (as indicated in the profile) may be assigned to the pattern. Assigning the QOS level=1 for the pattern may include assigning QOS=1 for any subsequently received SET requests of the detected pattern and may also include assigning QOS=1 to other SET requests (e.g., possibly from other clients) that may also affect data returned in GET requests of the detected pattern. It should be noted that an embodiment may also make simplifying assumptions in connection with what configuration updates may be reflected in the information returned to the client in response to any GET request in the detected pattern. For example, assigning the QOS level=1 for the pattern may include assigning QOS=1 for any subsequent SET requests of the detected pattern from the client and may also include ensuring that the cache has been updated to reflect changes of the first SET request (to create LUN 1) prior to returning the requested information for the first GET request (e.g., also reassigning QOS=1 to the first SET request, the SET request of the detected pattern as received prior to the first GET request if the cache has not yet been updated to incorporate such configuration changes of the first SET request). However, the embodiment may not provide for incorporating or ensuring other cache updates beyond those of the same client in the detected pattern.

A defined profile may also be applicable to certain clients or clients having certain attributes as may be specified in the client request or when the client initially establishes the session (e.g., based on a user id or account, all sessions originating from a particular client workstation, whether the client requests are issued from a CLI or GUI, and the like). For example, a first SET request from a client where the client is using a CLI may have a default QOS level of 3. However, if the same SET request is issued from the client using a GUI, the SET request may have a default QOS level of 2 due to the fact that the information is being displayed in a GUI as opposed to a CLI.

Figure 12:
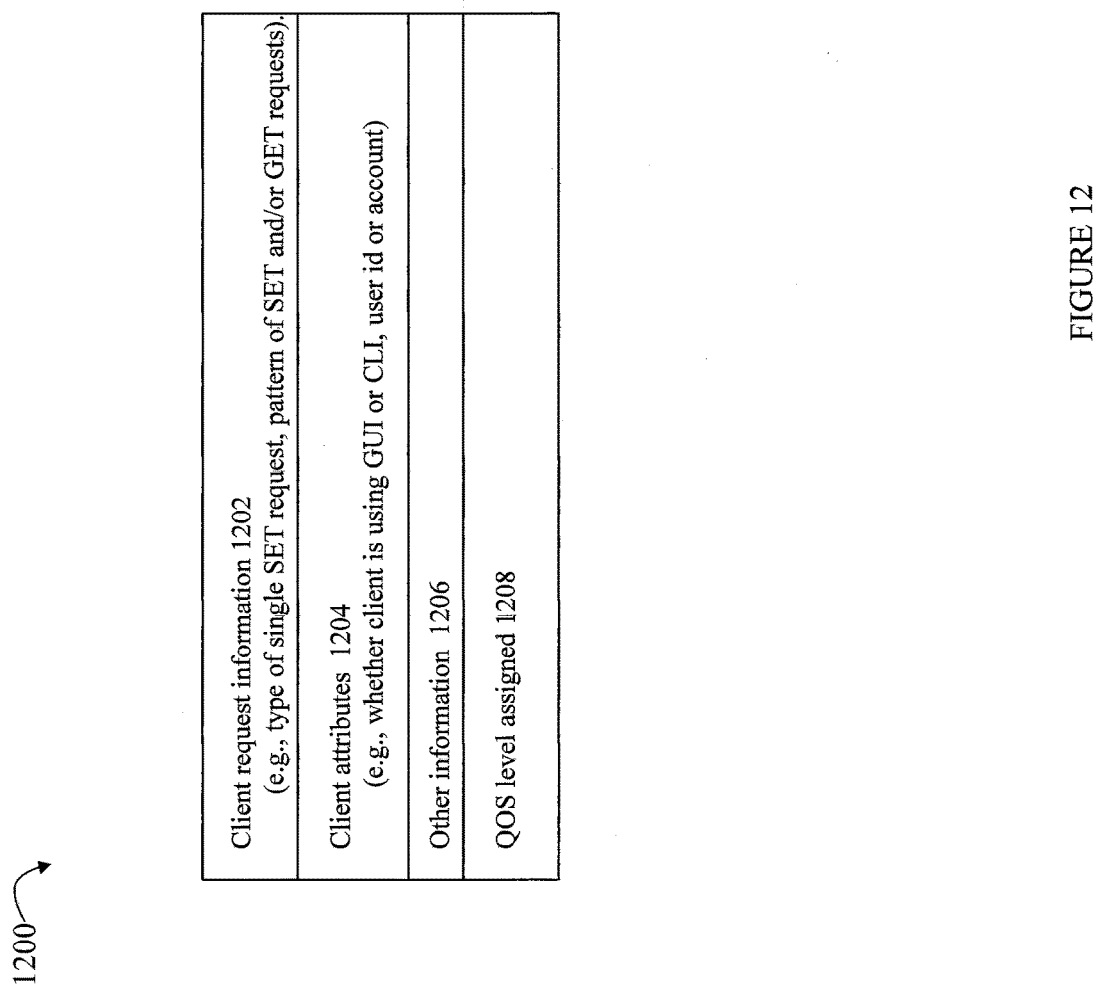
FIG. 12 is an example illustrating information that may be included in a QOS profile as may be used in an embodiment in accordance with techniques herein.

Referring to FIG. 12, shown is an example representing information that may be included a QOS profile affecting cache updates in an embodiment in accordance with techniques herein. The example 1200 illustrates a QOS profile including client request information 1202, client attributes 1204, possibly other information 1206 and the QOS level assigned 1208. Generally, the data storage system or server may perform processing to determine whether one or more client requests match or meet criteria specified in the profile. Such criteria may be specified in elements 1202, 1204 and/or 1206. If such criteria is met, the QOS level assigned is that identified in 1208. For a simple profile, the client request information 1202 may identify a particular type of SET request, such as to create a LUN, RAID group or storage group. Element 1202 may also identifying a pattern or sequence of multiple requests as described elsewhere herein whereby the data storage system may monitor client requests to determine whether multiple client requests match the specified pattern. Client attributes 1204 may include, for example, whether the client issuing the request is using a CLI or GUI and/or the user id or account where the client requests are issued by an authorized user logged onto to the client using data storage management software. In one embodiment, the QOS level may be explicitly specified in the client requests as well as determined using QOS profiles. In such an embodiment, an explicitly specified QOS level in a client request may override any implicit determination of QOS levels as may be determined using QOS profiles.

Figure 13:
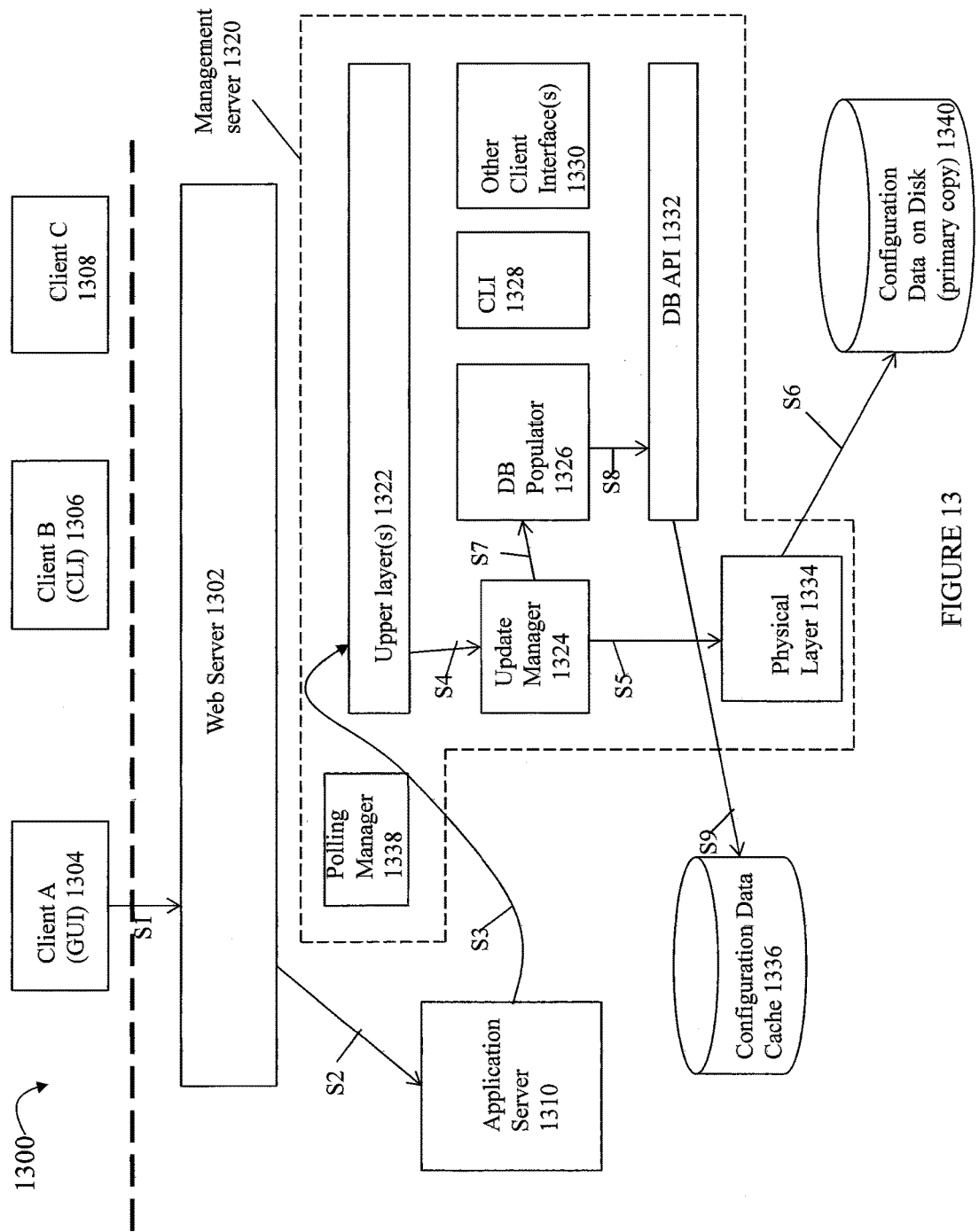
FIGS. 13-15 are examples illustrating components and dataflow in connection with client requests in one embodiment in accordance with techniques herein.

Referring to FIGS. 13-16, shown are examples of components and data flow therebetween in connection with requests as may be performed in one embodiment in accordance with techniques herein. With reference to FIG. 13, shown are components and data flow in connection with a client request where the client is utilizing a first protocol with an associated GUI for user interaction with the client 1304. As described herein, the client 1304 may be executing code for a GUI included in data storage configuration management software for performing data storage configuration operations. The example 1300 includes clients 1304, 1306 and 1308 (each utilizing a different client interface and associated protocol to communicate with the data storage system. All components in the example 1300 below the dashed line may be included in the data storage system functioning as a server for client configuration requests. The data storage system may include the web server 1302, an application server 1310, configuration data cache 1336, configuration data on disk 1340, and management server 1320. The management server 1320 may include a polling manager 1338, upper layers 1322, update manager 1324, DB (database) populator 1326, one or more other client interface components such a the CLI 1328 and other client interface(s) 1330, a DB API 1332, and a physical layer 1334. The data storage system may also include components other than those illustrated in FIG. 13. In connection with client 1304 executing a GM for use with techniques herein when issuing a SET request from the client 1304, data flow may communicate the request to the web server 1302 (S1) and then to the application server 1310 (S2). The web server 1302 may perform authentication for the client and the application server 1310 may perform authorization processing to determine whether the client issuing the request has appropriate authorization (e.g., to modify or update the configuration data). The application server 1310 may perform processing to transform the client request into a form understood by the management server 1320. In this example, the management server 1320 may communicate in accordance with a protocol and model such as the common information model (CIM) using XML-based messages. The application server 1310 then sends the client request to the upper layers 1322 of the management server 1320. The upper layers 1322 may parse the received request and communicate with components in the management server 1320 depending on the particular operation specified in the request. In this case for a SET request, the SET request is forwarded to the update manager 1324 (S4). The update manager 1324 may perform processing as described elsewhere herein to determine a QOS level of the request, select the appropriate cache update technique to use based on the QOS level, and accordingly update the configuration data on disk 1340 and the cached copy of the configuration data 1336. For the SET request, the update manager 1324 perform processing to update the configuration data on disk 1340 by issuing communicating (S5) the change request to the physical layer 1334 which then updates the configuration data on disk 1340. For the SET request, the update manager 1324 perform processing to update the cached copy of the configuration data 1336 by issuing (S7) a request or notification to the DB populator 1326 which uses (S8) the DB API (application programming interface) to apply (S9) the change or updates the cached configuration data 1336. Communications back to the client 1304 may use reverse traversal of the paths denoted by the data flow arrows S1-S9 just described. As noted elsewhere herein, whether the additional indication processing (as denoted by S7, S8 and S9) to update the cache 1336 is performed is dependent on the QOS level (e.g., for QOS levels 1 and 2). In the case where the QOS level is 3, steps S7, S8 and S9 may be omitted and the update to the configuration data 1340 is incorporated into the cached configuration data 1336 in connection with routine or normal cache update processing.

As described elsewhere herein, normal routine cache update processing may be performed in an embodiment, for example, by having the update manager 1324 periodically poll the physical layer 1334 to obtain updates to the configuration data 1340 since the previous polling period. The configuration data updates are communicated back to the update manager 1324 which then applies the updates to the cached configuration data 1336 via the DB populator and DB API 1332. The polling manager 1338 may be a component that sends an indication to the update manager 1324 upon the occurrence of each defined polling interval in order to trigger the update manager 1324 to perform the routine configuration data cache update processing as just described.

It should be noted that each of the clients 1304, 1306, and 1308 may communicate SET and/or GET requests using different interfaces and thus different communication paths in connection with issuing these client requests. For example, FIG. 13 describes one data flow for SET requests in connection with client 1304 which utilizes a GUI. What will be described as illustrated in FIG. 14 is a second data flow in connection with client 1306 issuing a SET request whereby client 1306 may utilize a CLI rather than a GUI.

Figure 14:
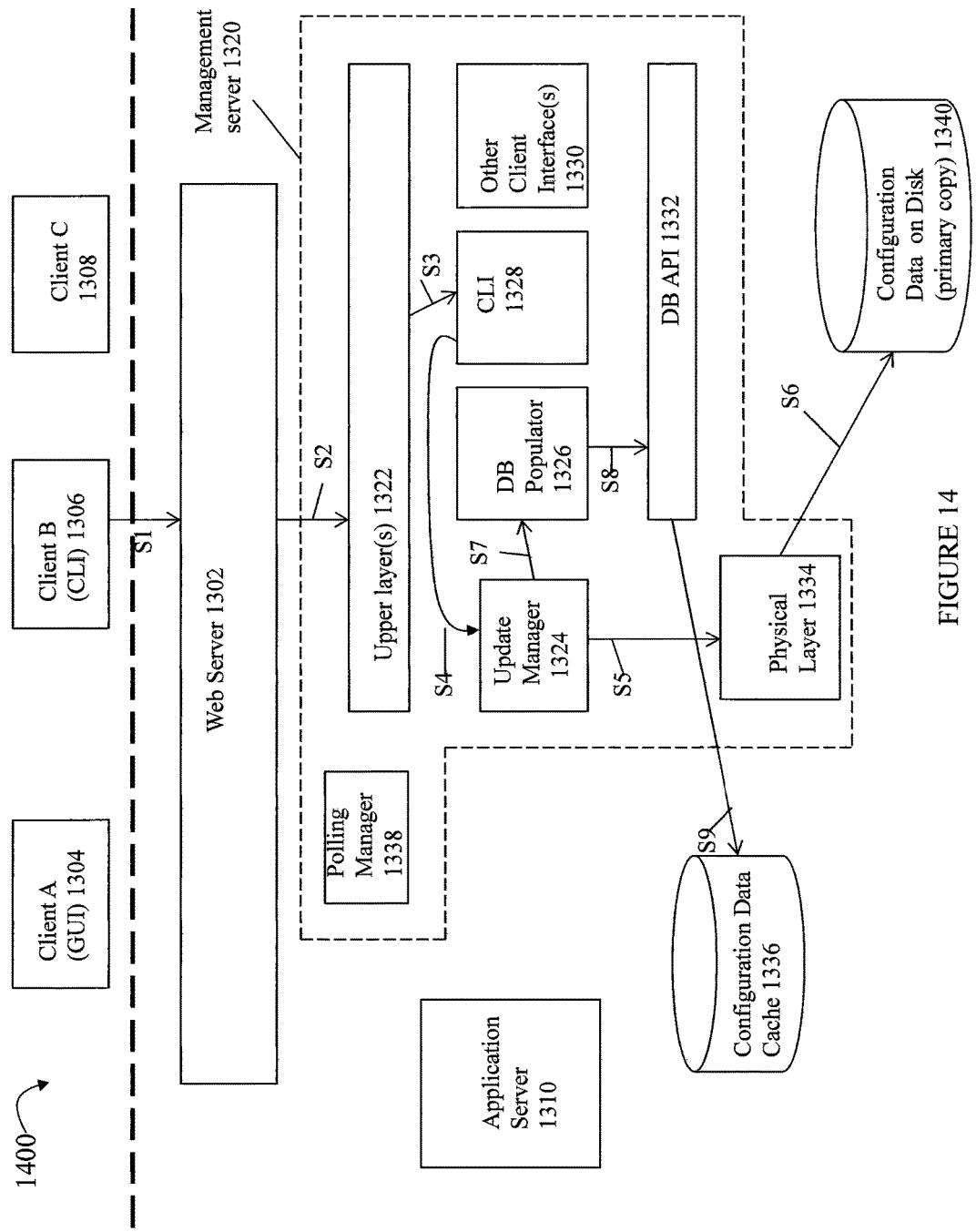

With reference now to FIG. 14, client 1306 may issue a SET request to the web server 1302 (S1) which is then sent (S2) to the upper layers 1322 of the management server

1320. The upper layers 1322 may parse the received request and communicate with components in the management server 1320 depending on the particular operation specified in the request. In this case for a SET request, the SET request is forwarded (S3) to the CLI interface component 1328 and then to the update manager 1324 (S4). The update manager 1324 may perform processing as described elsewhere herein to determine a QOS level of the request, select the appropriate cache update technique to use based on the QOS level, and accordingly update the configuration data on disk 1340 and the cached copy of the configuration data 1336. For the SET request, the update manager 1324 perform processing to update the configuration data on disk 1340 by communicating (S5) the change request to the physical layer 1334 which then updates the configuration data on disk 1340. For the SET request, the update manager 1324 perform processing to update the cached copy of the configuration data 1336 by issuing (S7) a request or notification to the DB populator 1326 which uses (S8) the DB API (application programming interface) to apply (S9) the change or updates the cached configuration data 1336. Communications back to the client 1306 may use reverse traversal of the paths denoted by the data flow arrows S1-S9 just described. As noted elsewhere herein, whether the additional indication processing (as denoted by S7, S8 and S9) to update the cache 1336 is performed is dependent on the QOS level (e.g., for QOS levels 1 and 2). In the case where the QOS level is 3, steps S7, S8 and S9 may be omitted and the update to the configuration data 1340 is incorporated into the cached configuration data 1336 in connection with routine or normal cache update processing.

Figure 15:
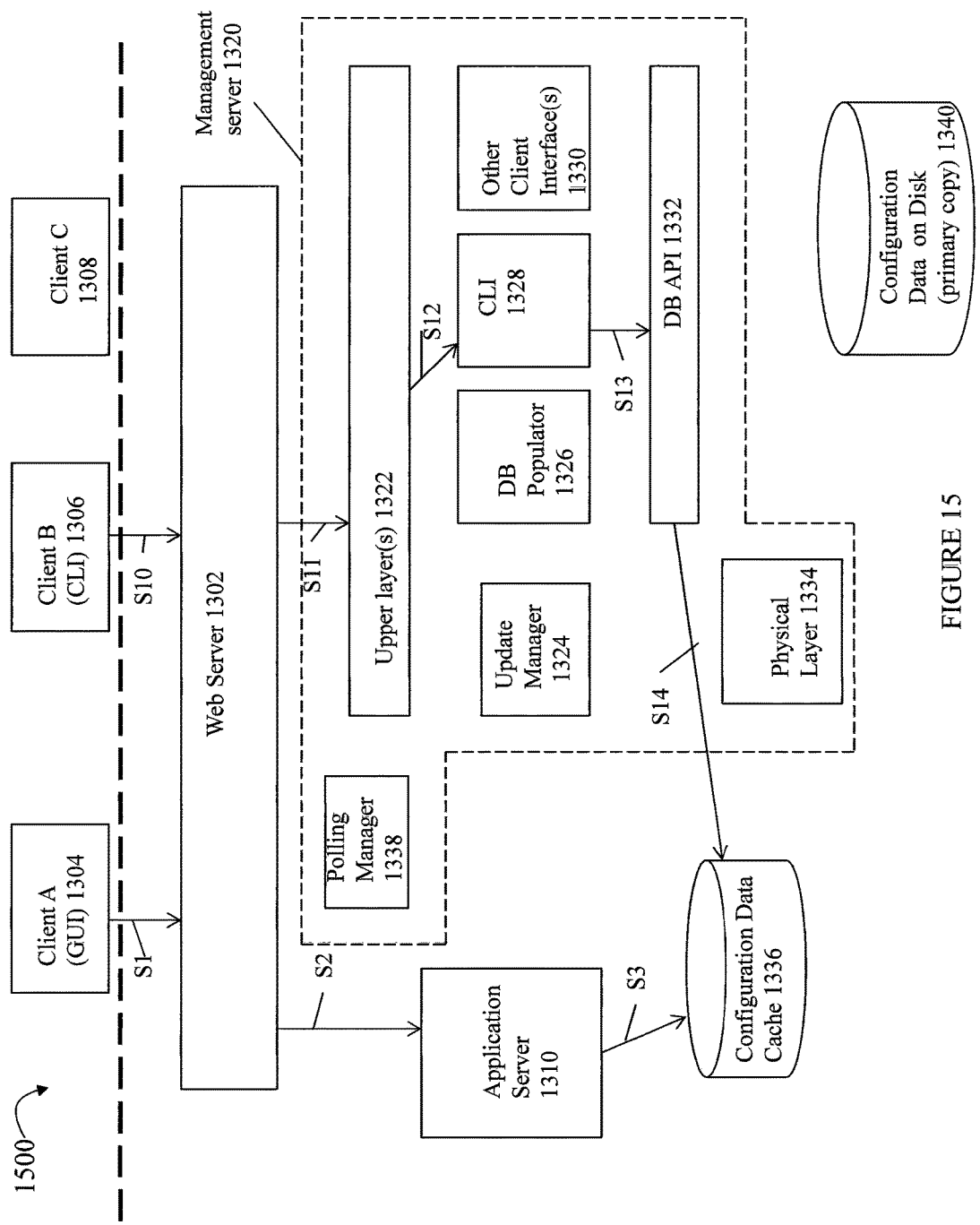

Referring to FIG. 15, shown is an example illustrating components and data flow as may be performed in connection with client GET requests in an embodiment in accordance with techniques herein. For client 1304 using a GUI that issues a GET request, the request may be sent (S1) to the web server 1302 of the data storage system and then (S2) to the application server 1310. The application server 1310 may then obtain (S3) the requested data from the cache 1336 and return the data to the client in a response reversing traversal of the foregoing path (e.g., S3, S2 to S1). For client 1306 using a CLI that issues a GET request, the request may be sent (S10) to the web server 1302 of the data storage system, to the upper layers 1322 (denoted by S12), to the CLI component 1328 (denoted by S12), to the DB API 1332 (denoted by S13) to obtain (S14) the requested data from the cache 1336. The data may be returned to the client in a response reversing traversal of the foregoing path (e.g., S14, S13, S12, S11, to S10). In connection with the foregoing for GET requests, user authentication may be performed by the web server 1310 as described in connection with SET requests and authorization for the requested user and operation may be performed by the DB API and the application server.

What will now be described in connection with FIGS. 16-19 are flowcharts summarizing processing steps that may be performed in an embodiment in accordance with techniques herein in connection with client SET requests and normal or routine cache update processing.

Figure 16:
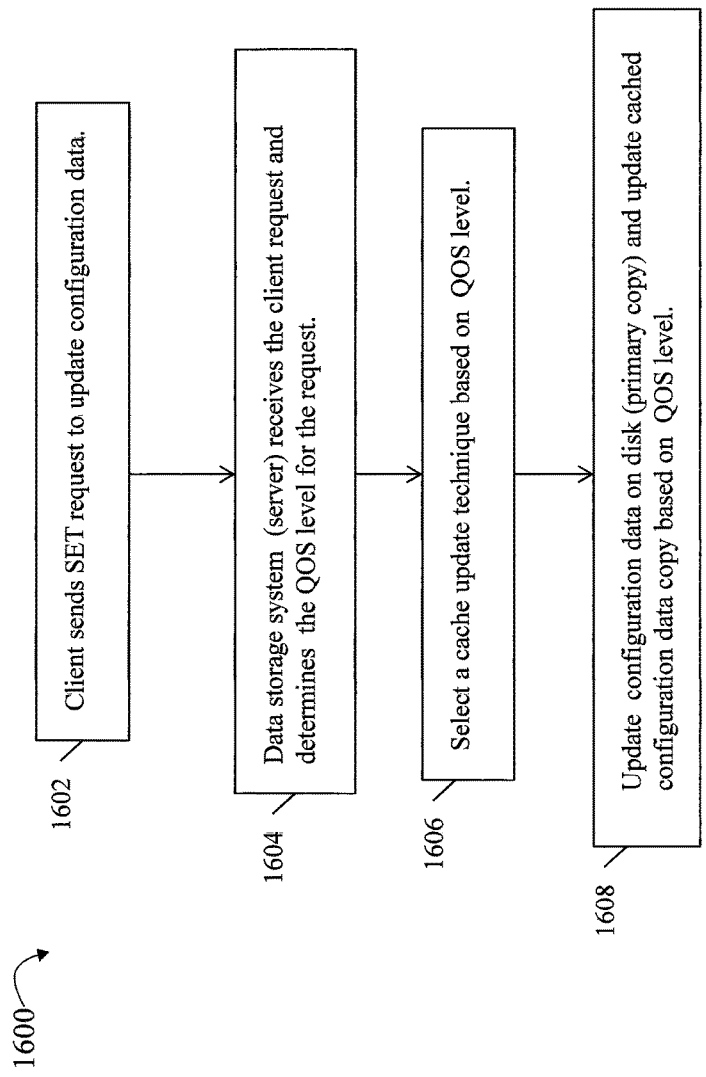
FIGS. 16, 17, 18A, 18B and 19 are flowcharts of processing steps as may be performed in one embodiment in accordance with techniques herein.

Referring to FIG. 16, shown is a flowchart of processing steps that may be performed in an embodiment in accordance with techniques herein for a client SET request. At step 1602, the client sends the SET request to update the configuration data to the data storage system. At step 1604, the data storage system receives the request and determines a QOS level for the request. At step 1606, a cache update technique is selected based on the determined QOS level for the request. At step 1608, the configuration data and cached copy are accordingly updated based on the QOS level.

Figure 17:
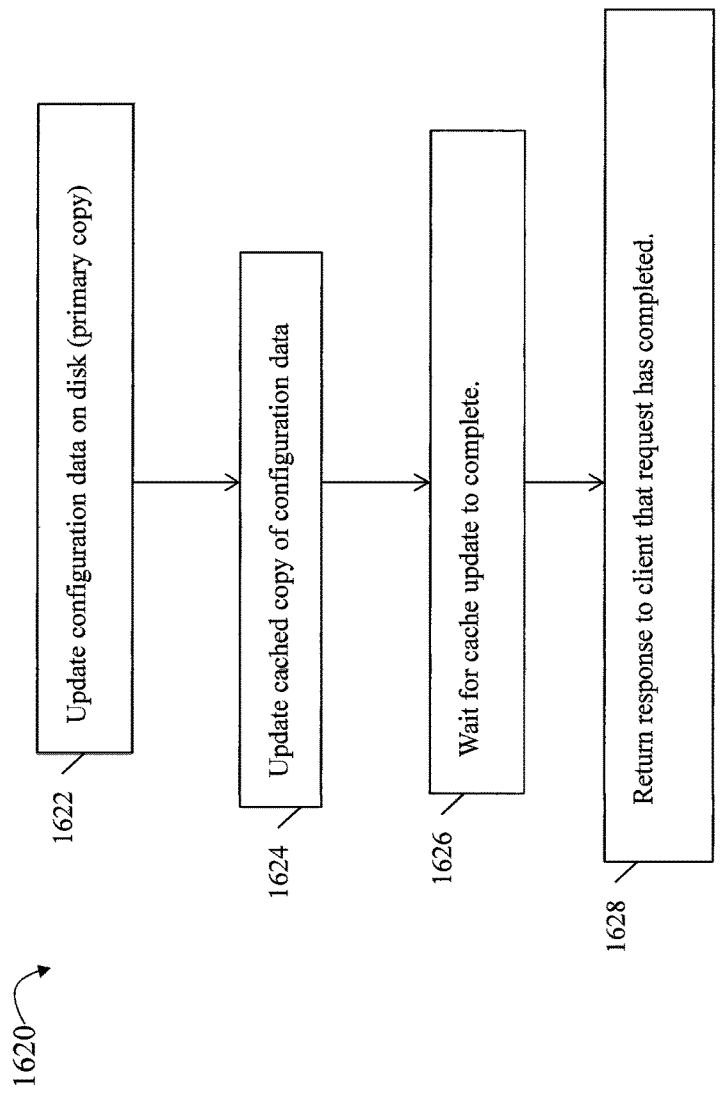

Referring to FIG. 17, shown is a flowchart of processing steps that may be performed in an embodiment in accordance with techniques herein for a client SET request with QOS level=1. At step 1622, the configuration data on the disk (primary copy) is updated. At step 1624, the cached copy of the configuration data is updated. At step 1626, processing on the data storage system waits for the cache update to complete before returning a response to the client in step 1628 that the request has been completed. The flowchart 1620 summarizes processing as described in connection with FIG. 3.

Figure 18A:
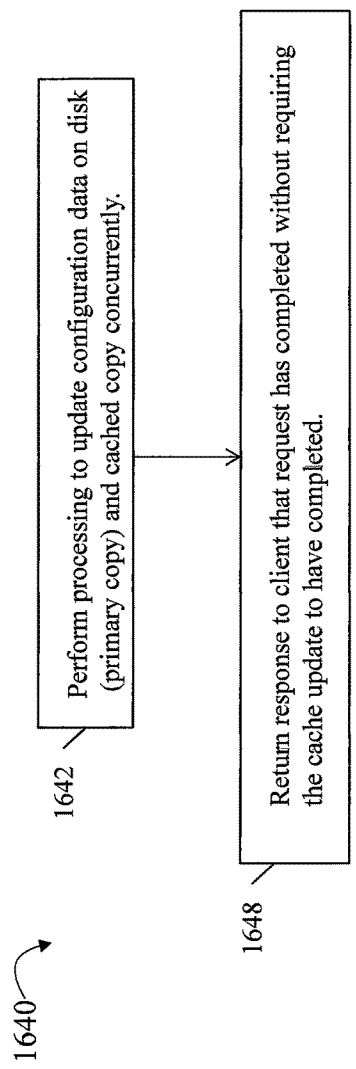

Referring to FIG. 18A, shown is a flowchart of processing steps that may be performed in an embodiment in accordance with techniques herein for a client SET request with QOS level=2. At step 1642, the configuration data on the disk (primary copy) is updated concurrently with the cached copy. At step 1648, a response is returned to the client that the request has been completed without requiring the cache update to have completed. The flowchart 1640 summarizes processing as described in connection with FIG. 4.

Figure 18B:
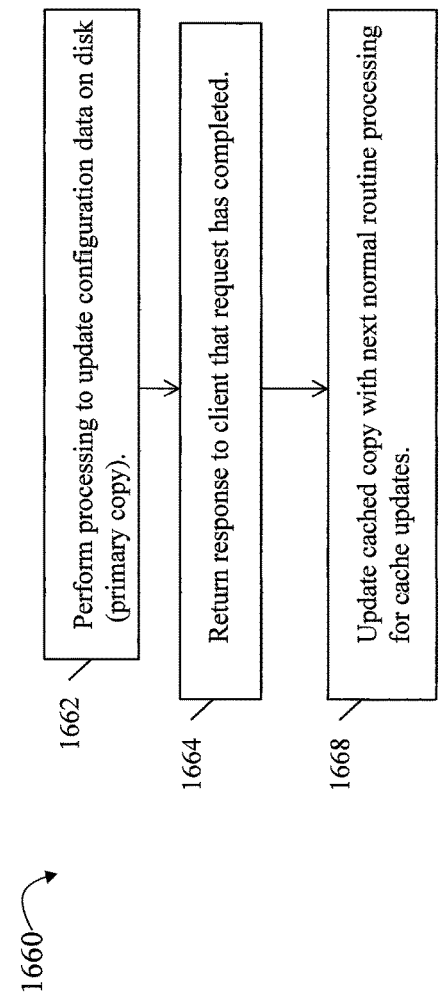

Referring to FIG. 18B, shown is a flowchart of processing steps that may be performed in an embodiment in accordance with techniques herein for a client SET request with QOS level=3. At step 1662, the configuration data on the disk (primary copy) is updated. At step 1664, a response is returned to the client that the request has been completed. In step 1668, the cached copy is updated to include the configuration data modifications identified in the SET request in connection with the next normal routine processing for cache updating.

Figure 19:
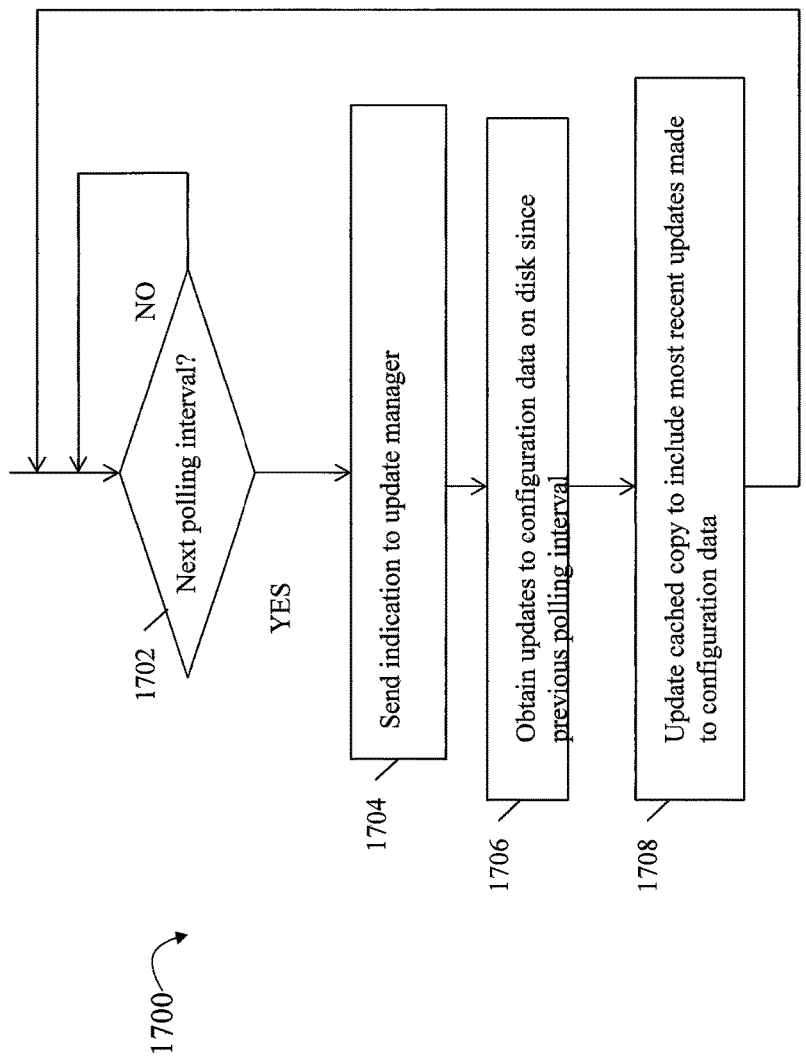

Referring to FIG. 19, shown is a flowchart of processing steps that may be performed in an embodiment in accordance with techniques herein for normal or routine cache update processing. At step 1702, a determination is made as to whether the next polling interval has occurred. If not, processing waits at step 1702 until the next polling interval occurs. Once the next polling interval occurs, processing proceeds to step 1704 where an indication is sent by the polling manager to the update manager thereby requesting that the cache be updated. At step 1706, the update manager obtains any updates to the configuration data since the previous polling interval from the physical layer. In step 1708, the cached copy of the configuration data is updated to include the most recent updates made to the configuration data as just obtained in step 1706 from the physical layer. From step 1708, processing returns to step 1702 to wait for the next polling interval occurrence.

An embodiment may implement the techniques herein using code executed by a processor. For example, an embodiment may implement the techniques herein using code which is executed by a processor of the data storage system. As will be appreciated by those skilled in the art, the code may be stored on the data storage system on a computer-readable storage medium having any one of a variety of different forms including volatile and nonvolatile, removable and non-removable media implemented in any method or technology for storage of information such as computer readable instructions, data structures, program modules or other data. Computer-readable storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for processing requests comprising:
   receiving, from a user interface of a client at a server and using a processor, a request to apply a first update that updates a primary copy of first data stored on the server, a cached copy of the first data additionally being stored in a cache of the server, wherein the user interface of the client is a graphical user interface or a command line interface;
   determining, using a processor, a quality of service for the request based on the request, the client, and one or more prior requests, said quality of service varying with an urgency of the client to have the cached copy of the first data reflect the first update, the quality of service varying in accordance with whether the user interface is the graphical user interface or the command line interface, wherein, when the user interface is the graphical user interface, the quality of service denotes a higher level of urgency and higher quality of service level than when the user interface is the command line interface;
   performing, using a processor, periodic cache update processing that, at each occurrence of a time interval, updates cached copies of data stored in the cache of the server using corresponding primary copies of data from the server;
   responsive to said receiving, applying, using a processor, the first update to the primary copy of the first data stored on non-volatile storage of the server; and
   determining, using a processor and in accordance with the quality of service, whether to perform an additional update to the cache to apply the first update to the cached copy of the first data stored in the cache of the server, wherein said additional update is an out of band cache update operation performed in addition to cache updating performed by said periodic cache update processing.

2. The method of claim 1, wherein the quality of service associated with the request is one of a plurality of predefined quality of service levels.

3. The method of claim 2, wherein the plurality of predefined quality of service levels includes three predefined quality of service levels, a first of the three predefined quality of service levels denoting a highest quality of service, a second of the three predefined quality of service levels denoting a level lower than the first quality of service level, and a third of the three predefined quality of service levels denoting a level lower than the second quality of service level.

4. The method of claim 3, wherein the quality of service associated with the request is the first quality of service level and the method includes:
   performing first processing to apply the first update to the primary copy of the first data;
   performing second processing to apply the first update to the cached copy of the first data; and
   returning a response to the client that the request has completed after the first update has been applied to both the cached copy and the primary copy of the first data.

5. The method of claim 3, wherein the quality of service associated with the request is the second quality of service level and the method includes:
   performing first processing to apply the first update to the primary copy of the first data;
   performing second processing to apply the first update to the cached copy of the first data; and
   returning a response to the client that the request has completed, wherein the response is returned after the first update has been applied to the primary copy of the first data and without requiring that the first update be applied to the cached copy of the first data.

6. The method of claim 5, wherein the first processing and the second processing are performed concurrently and all of the first processing and at least a portion of the second processing has completed prior to returning the response to the client.

7. The method of claim 3, wherein the quality of service associated with the request is the third quality of service level and the method includes:
   performing first processing to apply the first update to the primary copy of the first data; and
   returning a response to the client that the request has completed after the first update has been applied to the primary copy of the first data and prior to commencing second processing to apply the first update to the cached copy.

8. The method of claim 7, wherein the second processing is performed as part of said periodic cache update processing where updates to the first data including the first update are applied to the cached copy at an occurrence of said time interval that is a predetermined time interval.

9. The method of claim 1, wherein the client issues a second request to read at least a portion of the first data and the second request is serviced by the server using the cached copy of the first data.

10. The method of claim 1, wherein all requests to read the first data are serviced using the cached copy of the first data and not serviced using the primary copy of the first data.

11. The method of claim 1, wherein the quality of service is specified as a value in a field of the request where the value identifies one of a predefined set of quality of service levels.

12. The method of claim 1, wherein said determining the quality of service for the request further comprises:
   determining whether the request to perform the first update to the first data specifies a quality of service level for cache updating; and
   responsive to determining that the request does not specify a quality of service level for cache updating, determining a default quality of service level in accordance with a quality of service policy, wherein said default quality of service level is used as the quality of service in connection with applying the first update of the request to the cached copy of the first data stored in the cache of the server.

13. The method of claim 12, wherein the quality of service is not specified in a field of the request and the server performs first processing to implicitly determine the quality of service.

14. The method of claim 13, wherein the quality of service policy is defined using a one or more profiles, and wherein the first processing includes determining a match between criteria included in a first of the one or more profiles and first information associated with any of the client and the request, wherein the first profile specifies a new quality of service level associated with the request if first processing determines a match between the criteria and the first information.

15. The method of claim 14, wherein the criteria of the first profile includes any of a type of request, a pattern of a plurality of requests, and client attributes.

16. The method of claim 15, wherein the client attributes include information denoting whether the client is using the graphical user interface or the command line interface to issue the request and information identifying a user account.

17. The method of claim 1, wherein the first data is data storage configuration data, the client issues the request to modify the data storage configuration data, the server is the data storage system having a configuration described by the data storage configuration data and wherein a primary copy of the data storage configuration data is stored on a storage device of the data storage system.

18. A non-transitory computer readable medium comprising code stored thereon that, when executed, performs a method for processing requests comprising:
   receiving, from a user interface of a client at a server, a request to apply a first update that updates a primary copy of first data stored on the server, a cached copy of the first data additionally being stored in a cache of the server, wherein the user interface of the client is a graphical user interface or a command line interface;
   determining a quality of service for the request based on the request, the client and one or more prior requests, said quality of service varying with an urgency of the client to have the cached copy of the first data reflect the first update, the quality of service varying in accordance with whether the user interface is the graphical user interface or the command line interface, wherein, when the user interface is the graphical user interface, the quality of service denotes a higher level of urgency and higher quality of service level than when the user interface is the command line interface;
   performing periodic cache update processing that, at each occurrence of a time interval, updates cached copies of data stored in the cache of the server using corresponding primary copies of data from the server;
   responsive to said receiving, applying the first update to the primary copy of the first data stored on non-volatile storage of the server; and
   determining, in accordance with the quality of service, whether to perform an additional update to the cache to apply the first update to the cached copy of the first data stored in the cache of the server, wherein said additional update is an out of band cache update operation performed in addition to cache updating performed by said periodic cache update processing.

19. The non-transitory computer readable medium of claim 18, wherein the quality of service associated with the request is one of a plurality of predefined quality of service levels.

20. The non-transitory computer readable medium of claim 19, wherein the plurality of predefined quality of service levels includes three predefined quality of service levels, a first of the three predefined quality of service levels denoting a highest quality of service, a second of the three predefined quality of service levels denoting a level lower than the first quality of service level, and a third of the three predefined quality of service levels denoting a level lower than the second quality of service level.

21. A system comprising:
   a client; and
   a data storage system in communication with said client, the data storage system including a memory comprising code stored therein that, when executed, performs a method for processing requests comprising:
      receiving, from a user interface of the client, a request to apply a first that updates a primary copy of first data stored on the data storage system, a cached copy of the first data being additionally stored in a cache of the data storage system, wherein the user interface of the client is a graphical user interface or a command line interface;
      determining a quality of service for the request based on the request, the client, and one or more prior requests, said quality of service varying with an urgency of the client to have the cached copy of the first data reflect the first update, the quality of service varying in accordance with whether the user interface is the graphical user interface or the command line interface, wherein, when the user interface is the graphical user interface, the quality of service denotes a higher level of urgency and higher quality of service level than when the user interface is the command line;
      performing periodic cache update processing that, at each occurrence of a time interval, updates cached copies of data stored in the cache of the data storage system using corresponding primary copies of data from the data storage system;
      responsive to said receiving, applying the first update to the primary copy of the first data stored on non-volatile storage of the data storage system; and
      determining, in accordance with the quality of service, whether to perform an additional update to the cache to apply the first update to the cached copy of the first data stored in the cache of the data storage system, wherein said additional update is an out of band cache update operation performed in addition to cache updating performed by said periodic cache update processing.

* * * * *